US007812138B2

(12) United States Patent  
Lihme et al.

(10) Patent No.: US 7,812,138 B2
(45) Date of Patent: *Oct. 12, 2010

(54) FRACTIONATION OF PROTEIN CONTAINING MIXTURES

(75) Inventors: Allan Otto Fog Lihme, Birkerod (DK); Marie Bendix Hansen, Niva (DK); Inga Vaarst Andersen, Soborg (DK); Morten Aae Olander, Copenhagen (DK)

(73) Assignee: Upfront Chromatography A/S, Copenhagen O (DK)

( * ) Notice: Subject to any disclaimer, the term of this patent is extended or adjusted under 35 U.S.C. 154(b) by 0 days.

This patent is subject to a terminal disclaimer.

(21) Appl. No.: 10/478,111

(22) PCT Filed: May 31, 2002

(86) PCT No.: PCT/DK02/00375

§ 371 (c)(1),
(2), (4) Date: Mar. 10, 2004

(87) PCT Pub. No.: WO02/096215

PCT Pub. Date: Dec. 5, 2002

(65) Prior Publication Data

US 2005/0065329 A1 Mar. 24, 2005

(30) Foreign Application Priority Data

Jun. 1, 2001 (DK) .............................. 2001 00869

(51) Int. Cl.
*A23J 3/00* (2006.01)
*A61K 38/00* (2006.01)
*C07K 14/00* (2006.01)

(52) U.S. Cl. ............................ 530/412; 530/300; 514/2
(58) Field of Classification Search ........................ None
See application file for complete search history.

(56) References Cited

U.S. PATENT DOCUMENTS

| 4,452,773 | A | * | 6/1984 | Molday ..................... 424/1.37 |
| 4,791,193 | A | | 12/1988 | Okonogi et al. |
| 4,976,865 | A | | 12/1990 | Sanchez et al. |
| 5,516,675 | A | * | 5/1996 | Uchida et al. ............... 435/192 |
| 5,522,993 | A | * | 6/1996 | Carlsson et al. ............. 210/635 |
| 5,596,082 | A | * | 1/1997 | Kussendrager et al. ...... 530/416 |
| 5,986,063 | A | | 11/1999 | Etzel |
| 6,620,326 | B1 | * | 9/2003 | Lihme et al. ................. 210/635 |
| 6,783,962 | B1 | * | 8/2004 | Olander et al. ............. 435/91.1 |
| 7,368,141 | B2 | * | 5/2008 | Lihme ........................ 426/531 |
| 2004/0140265 | A1 | * | 7/2004 | Lihme ........................ 210/656 |
| 2005/0220953 | A1 | * | 10/2005 | Lihme ........................ 426/491 |

FOREIGN PATENT DOCUMENTS

| EP | 0 538 350 | 4/1993 |
| GB | 1 586 364 | 3/1981 |
| WO | WO 86/03136 | 6/1986 |
| WO | WO 92/00799 | 1/1992 |
| WO | WO 92/16292 | 10/1992 |
| WO | WO 92/18237 | 10/1992 |
| WO | WO 93/13676 | 7/1993 |
| WO | WO 97/17132 | 5/1997 |
| WO | WO 98/08603 | 3/1998 |
| WO | WO 98/33572 | 8/1998 |
| WO | WO 99/15024 | 4/1999 |
| WO | WO 99/65586 | 12/1999 |
| WO | WO 00/57982 | 10/2000 |
| WO | WO 01/85329 | 11/2001 |

OTHER PUBLICATIONS

Rossomando, E. Methods in Enzymology 182: 309-317 (1990).*
Griffith et al. Journal of Chromatography A 776: 179-195 (1997). "Fluidization characteristics of and protein adsorption on fluoride-modified porous zirconium oxide particles".*
Straetkvern et al., "Expanded bed adsorption for recovery of patatin from crude potato juice", Bioseparation 7: 333-345 (1999).*
Anspach et al., "Expanded-bed chromatography in primary protein purification", Journal of Chromatrography A 865: 129-144 (1999).*
Burns et al., Biotechnol. Bioengin. 27 (1985) 137-145.
J. Porath et al. FEBS Letters, vol. 185, p. 306, Jun. 1985.
K.L. Knudsen et al. Analytical Biochemistry, vol. 201, p. 170, Oct. 1991.
J. Porath et al., Makromol. Chem., Makromal. Symp., vol. 17, p. 359, 1988.
A. Schwarz et al. Journal of Chromatography B, vol. 664, pp. 83-88, 1995.

* cited by examiner

*Primary Examiner*—Anand U Desai
(74) *Attorney, Agent, or Firm*—Merchant & Gould P.C.

(57) ABSTRACT

Thus, a primary aspect of the present invention relates to a method for the fractionation of a protein-containing mixture wherein the protein-containing mixture is selected from the group consisting of milk, milk derived products, milk derived raw materials, vegetable derived products, vegetable derived extracts, fruit derived products, fruit derived extracts, fish derived products, and fish derived extracts, the method comprising the steps of: a) optionally adjusting the pH of the mixture; b) applying the mixture to an adsorption column comprising an adsorbent, the adsorbent comprises a particle with at least one high density non-porous core, surrounded by a porous material, the adsorbent having a particle density of at least 1.5 g/ml and a mean particle size of at most 150 μm; c) optionally washing the column; d) eluting at least one protein from the adsorbent.

26 Claims, 16 Drawing Sheets

FRACTIONATION OF PROTEIN CONTAINING MIXTURES

FIELD OF THE INVENTION

The invention relates to an industrial production process and method for the isolation and fractionation of biomolecular substances, particularly proteins in milk and whey products as well as other milk derived raw materials. The selection of adsorbent allows for industrial scale separation of proteins from large volumes of liquids.

BACKGROUND OF THE INVENTION

Milk is one of the most thoroughly researched foods in history. Countless scientific papers document milk's composition and describe the biological functionalities in this complex bio-resource. Proteins, peptides, enzymes and other biomolecular substances constitute a major and very important fraction in milk and are believed responsible for many of the specific functionalities passed on from a mother to her newborn in addition to basic nutrients.

During the past two decades, there has been significant focus on utilisation of bovine whey proteins. Today, several bovine Whey Protein Concentrates (WPC) and bovine Whey Protein Isolates (WPI) are standard products obtained through various membrane filtration techniques as well as ion exchange adsorption procedures. Further utilisation of the bovine whey in terms of fractionation of the proteins into individual protein fractions, such as β-lactoglobulin, α-lactalbumin, immunoglobulins, lactoperoxidase, and lactoferrin, is made possible through chromatographic packed bed separation techniques. Protein products from chromatographic separation technologies are generally characterised by their low- to non-fat content and are useful for a broad range of applications e.g. within food, feed, functional foods, and health care products.

Since the first market introductions of WPC and WPI products and more recently the first purified single protein products (e.g. lactoferrin and lactoperoxidase) there has evolved an ever increasing demand for even more sophisticated and still more efficient and cost effective productions methods.

Among the various industrial chromatographic separation techniques developed in recent years, Expanded Bed Adsorption (EBA) has been successfully introduced to the certain fields of biotechnology industry. EBA is a type of fluidised bed adsorption wherein the level of back-mixing is kept at a minimum. Compared with other chromatographic separation technologies, EBA offer a significant advantage because it can be used directly with non-clarified feed.

During EBA, the adsorbent bed is allowed to expand inside the column when a flow of liquid is applied (see FIG. 1). Expansion/fluidisation of the bed is often effected in a column having provided at each of its ends a net structure covering the cross-sectional area of the column, or some other perforated devices, which will not generate turbulence in the flow. See, for instance, WO-A-9218237 (Amersham Pharmacia Biotech AB, Sweden). The same effect has also been observed in a system utilising a stirred inlet flow WO-A-9200799, (Up-Front Chromatography A/S). In addition, other distributors are likely to be feasible.

In the expanded bed state, the distance between the adsorbent particles result in a free passage of particulate impurities in the feed stream. By contrast, traditional packed beds work as depth filters that can clog, resulting in increased back-pressure unless the feed is thoroughly clarified. Since no significant pressure builds up in an EBA column, it is possible to apply EBA without the limitations in size and flow rate normally associated with packed-bed columns.

An EBA process is characterised by very limited back-mixing of the liquid inside the column as opposed to the well know turbulent fluidised beds typically employed for chemical reactions. Back-mixing in a bed is often measured as axial dispersion ("vessel dispersion number"), see Levenspiel, "Chemical Reaction Engineering" 2nd Edition, John Wiley & Sons (1972).

The adsorbent media employed in an EBA process must have a higher density than the feed stock in order to produce acceptable flow rates during operation. If the density is too low, the media will be lost in the column effluent. Generally, EBA adsorbent particles may either be designed to be impermeable to the fluid, in which case the available surface area per unit volume is small; or particles may be designed to be permeable to the fluid, in which case the material chosen has to have the correct density per se. Unfortunately, the most interesting materials for many applications, e.g. materials such as natural and synthetic polysaccharides like agar, alginates, carrageenans, agarose, dextran, modified starches, and celluloses; synthetic organic polymers and copolymers typically based on acrylic monomers used for chromatographic purification of proteins in packed bed columns are not of suitable density per se. Therefore, these materials are not readily applied in EBA.

However, certain types of organic polymers and certain types of silica based materials may be produced to provide carrier particles of suitable density, but such carriers may not at the same time be suitable adsorbents, e.g. for protein purification procedures, where such materials may provide low permeability, non-specific interactions and denature bound proteins. Further, for such polymers, it may be difficult and expensive to design derivatisation schemes for affinity chromatography media. In addition, certain types of permeable silica particles have been used for EBA. However, the properties of these materials are far from optimal. Thus, the materials are unstable at pH above 7, fragile to shear forces, and provide non-specific interactions. In addition solid silicate materials have a maximal density of approx. 2.5 g/mL.

The density of the adsorbent media may be controlled by an inert, high-density core incorporated in the polymer phase (composite media, conglomerates see e.g. WO-A-9200799). High-density core materials are typically chosen from high density materials such as glass, quartz or heavy metals either in the form of an alloy such as stainless steel or an oxide (e.g. zirconium oxide) or some other metal salt (e.g. tungsten carbide). The core material may also comprise metal spheres (e.g. tantalum). The core material of the particles may vary in size and shape. Typical sizes are within 5-80 micrometers.

In EBA, as a result of the optimisation of the characteristics of the adsorbent media (size distribution), plug-flow conditions with very little back-mixing is obtained inside the column. The plug-flow behaviour is crucial in order to obtain an efficient adsorption.

Today, several important bio-pharmaceuticals are being produced using the EBA technology. However, no commercial processes for milk and whey fractionation are based on EBA so far. This is in great part due to the large scale of the process required for milk and whey fractionation, typically involving extremely high volumes of raw material to be treated per day (e.g. several m³/hour) which requires extremely high efficiency and productivity of the EBA system. Current processes are not capable, in practice, to achieve the level of performance for these and certain other raw materials.

A major supplier of EBA adsorbents and EBA columns is UpFront Chromatography A/S, Denmark. These products are supplied under the trademark FastLine (see e.g.WO 92/00799, UpFront Chromatography A/S, Denmark), which discloses a large number of fillers and polymeric materials that can be combined to produce composite beads, conglomerates) intended for adsorption in EBA.

Amersham Pharmacia Biotech AB, Sweden markets StreamLine which utilise porous beads of agarose with quartz particles as filler material (WO-A-9218237, Pharmacia Biotech AB).

Another supplier is Bioprocessing Ltd. (Durham, England) whose porous glass beads (Prosep0) can be used for chromatography on expanded beds (Beyzavi et al, Genetic Engineering News, Mar. 1, 1994 17).

WO 97/17132 (Amersham Pharmacia Biotech) discloses a population of beads having a density >1 g/cm$^3$ and comprising a polymer base matrix in which a particulate filler is incorporated. The beads are characterized in that the filler particles have a density >3 g/cm$^3$ and in that the density and/or size of the beads are distributed within predetermined density and size ranges. Particularly important filler particles are those which have rounded shapes, for instance spheres, ellipsoids or aggregates/agglomerates thereof. The bead population is particularly usable in adsorption processes in fluidized beds, with preference to stable expanded beds.

WO 00/57982 discloses a particulate material having a density of at least 2.5 g/mL, where the particles of the particulate material have an average diameter of 5-75 μm, and the particles of the particulate material are essentially constructed of a polymeric base matrix, e.g. a polysaccharide such as agarose, and a non-porous core material, e.g. steel and titanium, said core material having a density of at least 3.0 g/mL, said polymeric base matrix including pendant groups which are positively charged at pH 4.0 or which are affinity ligands for a bio-molecule. Possible pendant groups include polyethyleneimine (PEI), diethylaminoethyl (DEAE) and quaternary aminoethyl (QAE). The materials are useful in expanded bed or fluidised bed chromatography processes, in particular for purification of bio-macromolecules such as plasmid DNA, chromosomal DNA, RNA, viral DNA, bacteria and viruses.

WO-A-8603136 (Graves and Burns; University Patents Inc) discloses beads containing magnetic filler particles and their use in fluidized beds stabilized by an externally applied magnetic field. See also Burns et al., Biotechnol. Bioengin. 27 (1985) 137-145.

WO-A1-9833572 (Amersham Pharmacia Biotech) discloses a method for adsorption of a substance from a liquid sample on a fluidized bead or stirred suspension, in which the beads used comprise a base matrix and exhibit a structure having affinity to the substance, characterized in that the structure is covalently bound to the base matrix via an extender. Populations of beads in which the beads contain a filler incorporated in a base matrix and an extender are also described.

In chromatography on packed beds it has earlier been suggested to use porous beads, the pores of which wholly or partly have been filled with hydrophilic gels carrying affinity ligands, such as ion exchange groups. One example is Macrosob-K which is macroporous kieselguhr which has been filled with agarose which in turn has been derivatized to exhibit DEAE or CM ion exchange groups (Macrosorb-KAX.DEAE and Macrosorb KAX.CM, respectively (GB-A-1,586,364, Miles). This latter type of materials have also been applied in fluidized bed chromatography (Bite et al., In: Verrall et al., Separations for Biotechnology (1987), Ellis Horwood LTD, Chapter 13, 193-199).

U.S. Pat. No. 4,976,865 (Sanchez, et al, CNRS) teaches fluidised beds and the use of segmented columns to mimic the multi-step adsorption taking place in packed as well as stabilised expanded beds for isolation of whey compounds. The beads used in the experimental part are silica particles (Spherosil, density=1.4 g/mL, mean particle size=225 μm) that have been coated. The linear flow rate implemented in the experimental part is $1.3 \times 10^{-3}$ m/s, which is equal to 468 cm/hour). The experimental parts discloses the use of this type of fluidized bed adsorption for separation of biological macromolecules from whey. There is no disclosure of any flow rates and/or binding capacities obtainable with adsorbents having a lower than 225 μm mean particle size.

Immunoglobulins—or antibodies—constitute a very important class of proteins which are present in various body fluids of mammals, birds and fish functioning as protective agents of the animal against substances, bacteria and virus challenging the animal. Immunoglobulins are typically present in animal blood, milk, and saliva as well as other body fluids and secretions.

All the above mentioned applications of immunoglobulins requires some sort of isolation of the antibody from the crude raw material, but each kind of application has its own very varying demands with respect to the final purity and allowable cost of the antibody product.

Generally, there exists a very broad range of different methods available for isolation of immunoglobulins giving a very broad range of final purities, yields and cost of the product.

Traditional methods for isolation of immunoglobulins are based on selective reversible precipitation of the protein fraction comprising the immunoglobulins while leaving other groups of proteins in solution. Typical precipitation agents being ethanol, polyethylene glycol, lyotropic (anti-chaotropic) salts such as ammonium sulfate and potassium phosphate, and caprylic acid.

Typically, these precipitation methods are giving very impure products while at the same time being time consuming and laborious. Furthermore, the addition of the precipitating agent to the raw material makes it difficult to use the supernatant for other purposes and creates a disposal problem. This is particularly relevant in relation to the large scale purification of immunoglobulins from for instance, whey.

Ion exchange chromatography is another well known method of protein fractionation frequently used for isolation of immunoglobulins. However, this method is not generally applicable because of the restraints in ionic strength and pH necessary to ensure efficient binding of the antibody together with the varying isoelectric points of different immunoglobulins.

Protein A and Protein G affinity chromatography are very popular and widespread methods for isolation and purification of immunoglobulins, particularly for isolation of monoclonal antibodies, mainly due to the ease of use and the high purity obtained. Although being popular it is however recognised that Protein A and Protein G poses several problems to the user among which are: very high cost, variable binding efficiency of different monoclonal antibodies (particularly mouse IgG$_1$), leakage of Protein A/Protein G into the product, and low stability of the matrix in typical cleaning solutions, e.g. 1 M sodium hydroxide. Each of these drawbacks have its specific consequence in the individual application, ranging from insignificant to very serious and prohibitive consequences.

Hydrophobic chromatography is also a method widely described for isolation of immunoglobulins, e.g. in "Application Note 210, BioProcess Media" published by Pharmacia LKB Biotechnology, 1991. In this publication, a state of the art product "Phenyl Sepharose High Performance" is described for the purpose of purifying monoclonal antibodies from cell culture supernatants. As with other hydrophobic matrices employed so far it is necessary to add lyotropic salts to the raw material to make the immunoglobulin bind efficiently. The bound antibody is released from the matrix by lowering the concentration of lyotropic salt in a continuous or stepwise gradient. It is recommended to combine the hydrophobic chromatography with a further step if highly pure product is the object.

The disadvantage of this procedure is the necessity to add lyotropic salt to the raw material as this gives a disposal problem and thereby increased cost to the large scale user. The addition of lyotropic salts to the raw materials would in many instances be prohibitive in large scale applications as the salt would prevent any economically feasible use of the immunoglobulin depleted raw material in combination with the problem of disposing several thousand liters of waste.

Thiophilic adsorption chromatography was introduced by J. Porath in 1985 (J. Porath et al; FEBS Letters, vol.185, p.306, 1985) as a new chromatographic adsorption principle for isolation of immunoglobulins. Porath describes the technology wherein divinyl sulfone-activated agarose in combination with various ligands comprising a free mercapto-group demonstrate specific binding of immunoglobulins in the presence of 0.5 M potassium sulfate, i.e. a lyotropic salt. It was postulated that the sulfone group, from the vinyl sulfone spacer, and the resulting thio-ether in the ligand was a structural necessity to obtain the described specificity and capacity for binding of antibodies. It was, however, later shown that the thio-ether could be replaced by nitrogen or oxygen if the ligand further comprised an aromatic radical (K. L. Knudsen et al, Analytical Biochemistry, vol 201, p.170, 1992).

Although the matrices described for thiophilic chromatography generally show good performance, they also have a major disadvantage in that it is needed to add lyotropic salts to the raw material to ensure efficient binding of the immunoglobulin, which is a problem for the reasons discussed above.

Other thiophilic ligands coupled to epoxy activated agarose have been disclosed in (I. Porath et.al., Makromol. Chem., Makromol. Symp., vol. 17, p.359, 1988) and (A. Schwarz et.al., Journal of Chromatography B, vol. 664, pp. 83-88, 1995), e.g. 2-mercaptopyridine, 2-mercaptopyrimidine, and 2-mercaptothiazoline. However, all these affinity matrices still have inadequate affinity constants to ensure an efficient binding of the antibody without added lyotropic salts.

To avoid the above mentioned problems and disadvantages the investigators of the present invention have developed a method for large scale fractionation, purification and isolation of at least one protein from a protein-containing mixture. This method is applicable for industrial use, it can handle very large volumes of a protein-containing mixture, it is fast and it provides a highly purified protein.

The investigators of the present invention also found that it was possible to carry out the fractionation, purification and isolation of proteins without the use of lyotropic salts.

SUMMARY OF THE INVENTION

Accordingly a general aspect of the present invention relates to a method of fractionating large volumes of protein-containing solutions using adsorbent which, despite having a small particle diameter and a very high density, exhibit a high binding capacity for the desired protein.

One object of the present invention is to provide a process for industrial-scale fractionation of proteins from raw materials using EBA methodology by selection of EBA adsorbents. As stated, this object is achieved at least in part by providing an EBA process utilising a specific adsorbent selected according to its particle diameter and particle density. This allows an EBA process for operating efficiently at linear flow rates above at least 200 cm/hour.

Thus, a primary aspect of the present invention relates to a method for the fractionation of a protein-containing mixture wherein the protein-containing mixture is selected from the group consisting of milk, milk derived products, milk derived raw materials, vegetable derived products, vegetable derived extracts, fruit derived products, fruit derived extracts, fish derived products, and fish derived extracts, said method comprising the steps of: a) optionally adjusting the pH of the mixture; b) applying said mixture to an adsorption column comprising an adsorbent, said adsorbent comprises a particle with at least one high density non-porous core, surrounded by a porous material, the adsorbent having a particle density of at least 1.5 g/ml and a mean particle size of at most 150 μm; c) optionally washing the column; d) eluting at least one protein from the adsorbent.

DETAILED DESCRIPTION OF THE INVENTION

Figure 1:
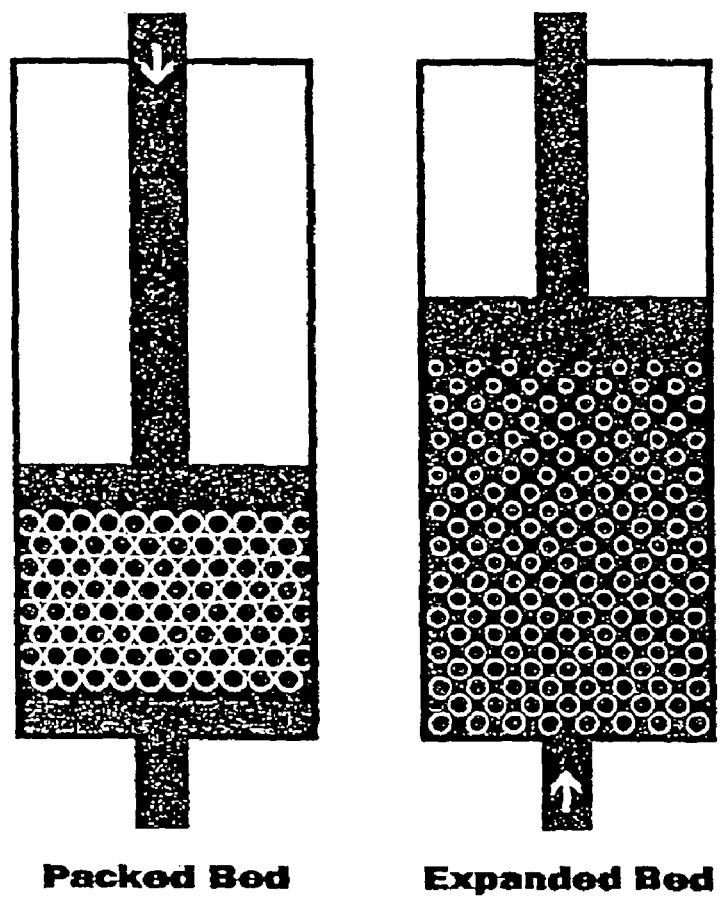
FIG. 1: Shows an illustration of the expansion of the adsorbent bed by an upward flow of liquid, compared to a traditional packed bed.

Accordingly the present invention provides a method for fractionation of a protein-containing mixture by utilisation of an equilibrated adsorbent column containing adsorbents comprising small sized particles having a large density. This selection of size and density allows an increased flow rate and makes it feasible to handle large volumes for industrial scale fractionation of protein-containing mixtures and obtaining highly pure proteins.

Protein-Containing Mixture

The method according to the present invention is targeted for industrial or large-scale fractionation processes where large volumes must be handled. Suitably, the protein-containing mixture is selected from the group comprising of milk, and milk derived products such as whey and other milk derived raw materials, vegetable derived products and extracts, fruit derived products and extracts, fish derived products and extracts. Typically, the protein-containing mixture is a milk-derived product, preferably selected from milk and whey.

In the present context, the term "protein-containing mixture" relates to a mixture of biological origin which comprises at least one protein or biomolecular substance needed to be fractionated, partially or wholly purified or isolated on a industrial or large scale. Typical mixtures include milk, skim milk, whey and other milk derived raw materials, vegetable derived products and extracts, fruit derived products and extracts, fish derived products and extracts.

The degree to which fractionation can be utilized in any particular dairy depends on the existing exploitation of the whey. If a production of WPC is running, it is possible to extract minor protein fractions and still sustain adequate WPC for an existing market. It may even be possible to extract one or more of the major whey proteins at low yield without harming an existing WPC market. In situations with no restrictions, it is possible to obtain multiple protein products from the whey stream.

pH Adjustment

In the dairy industry the process integration of EBA for whey protein fractionation is typically made in a cheese-making facility immediately following the removal of fines and whey cream. The whey may need an adjustment in pH (depending on the protein of interest), the ligand chemistry, and the type of whey.

In a preferred embodiment of the present invention the protein-containing mixture is pH adjustment to a pH facilitating the capture of the protein or proteins to be isolated, prior to being applied to the adsorbent column. This pH may be adjusted to a pH value selected in the entire pH range, preferably from pH 2-13, more preferably from pH 3-11.

Adsorbent Column

The adsorbent column to be used may be any kind suitable for either EBA (Expanded Bed Adsorption) or suitable for packed bed adsorption or a combination thereof. The adsorbent column may be used in either a batch system or in a continues system. In the present context the term "adsorbent column" relates to any kind of container which can be supplied with at least one inlet and at least one outlet for the application of the mixture to the column and subsequent to elute the protein.

The fact that the EBA technology generally can work efficiently with non-clarified raw materials makes it attractive to implement for the isolation and fractionation of biomolecular substances from milk and whey. Compared to processes based on packed bed adsorption techniques EBA may offer a robust process comprising fewer steps and thus result in increased yields and an improved process economy. Due to the expansion of the adsorbent bed during execution of an EBA process, EBA columns may further be scaled up to industrial scale without any significant considerations regarding increased back pressures or breakdown of the process due to clogging of the system which often is a problem when using packed bed columns. However, the present state of art within the EBA technology does not adequately address the specific problems associated with the treatment of extremely high volumes of raw materials, such as but not limited to milk and whey.

It is a further object of this invention to provide a process for isolation and fractionation of biomolecular substances from milk, skim milk, whey and other milk derived raw materials based on adsorption to any type of solid phase material of any shape and format including packed bed adsorption, batch adsorption, suspended bed adsorption, EBA and membrane based adsorption characterised by the use of selective ligand chemistry enabling the specific binding and subsequent elution of substantially only one biomolecular substance, or alternatively enabling a group specific binding of a few biomolecular substances followed by selective and consecutive elution of one or more substances from the adsorbent.

General Expansion Bed Adsorption technology is known to the person skilled in the art and the method of the present invention may be adapted to the processes described in, for example, WO 92/00799, WO 92/18237, WO 97/17132, WO 00/57982 and WO 98/33572.

Adsorbent

As stated, it is an overall object of the present invention to provide a novel process for isolation and fractionation of biomolecular substances from whole milk, skim milk, whey and other milk derived raw materials, which process is based on the use of EBA methodology and EBA adsorbents fulfilling the needs for implementing efficient EBA processes for isolation and fractionation of such biomolecular substances in an industrial scale. An initial but optional step in the process of the invention typically involves the equilibration of the adsorbent. In a preferred embodiment, the equilibration liquid is water such as tap water, demineralised water, water produced by reverse osmosis or distilled water.

In the present context the term "adsorbent" relates to the entire bed present in the adsorbent column and the term "adsorbent particle" are used interchangeably with the term "particle" and relates to the individual single particles which makes up the adsorbent.

The flow rate, the size of the particles and the density of the particles all have influence on the expansion of the fluid bed and it is important to control the degree of expansion in such a way to keep the particles inside the column. The degree of expansion may be determined as H/H0, where H0 is the height of the bed in packed bed mode and H is the height of the bed in expanded mode. In a preferred embodiment of the present invention the degree of expansion H/H0 is in the range of 1.0-20, such as 1.0-10, e.g. 1.0-6, such as 1.2-5, e.g. 1.5-4 such as 4-6, such as 3-5, e.g. 3-4 such as 4-6. In an other preferred embodiment of the present invention the degree of expansion H/H0 is at least 1.0, such as at least 1.5, e.g. at least 2, such as at least 2.5, e.g. at least 3, such as at least 3.5, e.g. at least 4, such as at least 4.5, e.g. at least 5, such as at least 5.5, e.g. at least 6, such as at least 10, e.g. at least 20.

The density of the EBA adsorbent particle is found to be highly significant for the applicable flow rates in relation to the maximal degree of expansion of the adsorbent bed possible inside a typical EBA column (e.g. H/H0 max 3-5) and must be at least 1.3 g/mL, more preferably at least 1.5 g/mL, still more preferably at least 1.8 g/mL, even more preferably at least 2.0 g/mL, most preferably at least 2.3 g/mL in order to enable a high productivity of the process.

In a preferred embodiment of the present invention the adsorbent particle has a mean particle size of at most 150 µm, particularly at most 120 µm, more particularly at most 100 µm, even more particularly at most 90 µm, even more particularly at most 80 µm, even more particularly at most 70 µm. Typically the adsorbent particle has a mean particle size in the range of 40-150 µm, such as 40-120 µm, e.g. 40-100, such as 40-75, e.g. 40-50 µm.

In a combination of preferred embodiments, where the average particle diameter is 120 µm or less, the particle density is at least 1.6 g/mL, more preferably at least 1.9 g/mL. When the average particle diameter is less than 90 µm the density must be at least 1.8 g/mL or more preferable at least 2.0 g/mL. When the average particle diameter is less than 75 µm the density must be at least 2.0 g/mL, more preferable at least 2.3 g/mL and most preferable at least 2.5 g/mL.

The high density of the adsorbent particle is, to a great extent, achieved by inclusion of a certain proportion of a dense non-porous core materials, preferably having a density of at least 4.0 g/mL, such as at least 5.0, Typically, the non-porous core material has a density in the range of about 4.0-25 g/ml, such as about 4.0-20 g/ml, e.g. about 4.0-15 g/mL, such as 12-19 g/ml, e.g. 14-18 g/ml, such as about 6.0-15.0 g/mL, e.g. about 6.0-10 g/ml.

Subsequently, the protein-containing mixture is loaded and the biomolecular substance(s) of interest are adsorbed, typically under pressure. Particulate material and soluble impurities are optionally removed from the column during the wash.

The fractionation may thus be performed efficiently by applying the protein-containing mixture to the adsorbent column at a linear flow rates of at least 3 cm/min, such as at least 5 cm/min, e.g. at least 8 cm/min, such as at least 10 cm/min e.g. 20 cm/min. Typically the flow rate is selected in the range of 5-50 cm/min, such as in the range of 5-15 cm/min, e.g. in the range of 10-30 cm/min, such as in the range of 25-50 cm/min. These increased flow rates are possible to a great extent due to the small particle size of the adsorbent.

Thus, in particular with regards to embodiments wherein the mixture is milk or milk derived material such as milk or whey, the application raw mixture to the adsorbent column is with a linear flow rate of at least 200 cm/hour, such as at least 300 cm/hour, more preferably at least 400 cm/hour, such as at least 500 or 600 cm/hour, such as at least 900 cm/hour.

When the protein-containing mixture is added to the adsorbent column the ratio between the adsorbent particle present in the column and the protein-containing mixture may be optimized in order to retain a high capacity of the adsorbent column and to obtain a high purity of the protein or proteins to be isolated. In a preferred embodiment of the present invention the adsorbent present in the column relative to the protein-containing mixture to be loaded on to the column are provided at a ratio of at least 1:1000, such as at least 1:800, e.g. at least 1:600, such as at least 1:400, e.g. at least 1:300, such as at least 1:200, e.g. at least 1:100, such as at least 1:50, e.g. at least 1:30, such as at least 1:15, e.g. 1:10, such as 1:5 measured on a volume/volume basis.

Several parameters have an influence on the flow rate that can be implemented in an EBA process. The fluidisation properties of the adsorbent particles (which may be described by the aid of Stokes Law) determine which flow rates that may be applied in order to expand the adsorbent and still keep it inside the column. The main factors influencing this are the diameter and the density of the adsorbent particles in combination with the viscosity of the liquid flowing through the column. However, the binding and mass transfer kinetics relevant to a specific application are equally important to ensure optimal efficiency and productivity of the EBA process. For example, it may be possible to run an EBA column containing a certain EBA adsorbent at very high flow rates in terms of the physical fluidisation and expansion properties, while the applied high flow rate results in a poor and inefficient adsorption (i.e. a low dynamic capacity) due to the fact that the target molecules to be bound cannot diffuse in and out of the adsorbent particles to match this flow rate (i.e. the mass transfer kinetics is the limiting factor).

Consequently, in a combination of particularly preferred embodiments of the invention, where the applied linear flow rate during application of the raw material is above 300 cm/hour, the mean particle diameter is below 150 µm. Typically, in embodiments where the fractionation process is performed at an applied linear flow rate of above 500 cm/min, the mean particle diameter is below 120 µm, preferably below 90 µm. Typically, in embodiments where the fractionation process is performed at an applied linear flow rate of above 600 cm/hour, the mean particle diameter is preferably below 85 µm, more preferably below 75 µm.

In a preferred embodiment of the present invention the adsorbent particle has a density of at least 1.5 g/ml, such as at least 1.8 g/ml, e.g. at least 2.0 g/ml, such as at least 2.5 g/ml, such as at least 2.6 g/ml, e.g. at least 3.0 g/ml, such as at least 3.5 g/ml, e.g. at least 4.0 g/ml, such as at least 5 g/ml, e.g. at least 7 g/ml, such as at least 10 g/ml, e.g. at least 15 g/ml.

The density of an adsorbent particle is meant to describe the density of the adsorbent in its fully solvated (e.g. hydrated) state as opposed to the density of a dried adsorbent.

The adsorbent particle used according to the invention must be at least partly permeable to the biomolecular substance to be isolated in order to ensure a significant binding capacity in contrast to impermeable particles that can only bind the target molecule on its surface resulting in relatively low binding capacity. The adsorbent particle may be of an array of different structures, compositions and shapes.

Thus, the adsorbent particles may be constituted by a number of chemically derivatised porous materials having the necessary density and binding capacity to operate at the given flow rates per se. The particles are either of the conglomerate type, as described in WO 92/00799, having at least two non-porous cores surrounded by a porous material, or of the pellicular type having a single non-porous core surrounded by a porous material.

In the present context the term "conglomerate type" relates to a particle of a particulate material, which comprises beads of core material of different types and sizes, held together by the polymeric base matrix, e.g. an core particle consisting of two or more high density particles held together by surrounding agarose (polymeric base matrix).

In the present context the term "pellicular type" relates to a composite of particles, wherein each particle consists of only one high density core material coated with a layer of the porous polymeric base matrix, e.g. a high density stainless steel bead coated with agarose.

Accordingly the term "at least one high density non-porous core" relates to either a pellicular core, comprising a single high density non-porous particle or it relates to a conglomerate core comprising more that one high density non-porous particle.

The adsorbent particle, as stated, comprises a high density non-porous core with a porous material surrounding the core, and said porous material optionally comprising a ligand at its outer surface.

In the present context the term "core" relates to the non-porous core particle or core particles present inside the adsorbent particle. The core particle or core particles may be incidental distributed within the porous material and is not limited to be located in the centre of the adsorbent particle.

The non-porous core constitutes typically of at most 50% of the total volume of the adsorbent particle, such as at most 40%, preferably at most 30%.

Examples of suitable non-porous core materials are inorganic compounds, metals, heavy metals, elementary non-metals, metal oxides, non metal oxides, metal salts and metal alloys, etc. as long as the density criteria above are fulfilled. Examples of such core materials are metal silicates metal borosilicates; ceramics including titanium diboride, titanium carbide, zirconium diboride, zirconium carbide, tungsten carbide, silicon carbide, aluminum nitride, silicon nitride, titanium nitride, yttrium oxide, silicon metal powder, and molybdenum disilide; metal oxides and sulfides, including magnesium, aluminum, titanium, vanadium, chromium, zirconium, hafnium, manganese, iron, cobalt, nickel, copper and silver oxide; non-metal oxides; metal salts, including barium sulfate; metallic elements, including tungsten, zirconium, titanium, hafnium, vanadium, chromium, manganese, iron, cobalt, nickel, indium, copper, silver, gold, palladium, platinum, ruthenium, osmium, rhodium and iridium, and alloys of metallic elements, such as alloys formed between said metallic elements, e.g. stainless steel; crystalline and amorphous forms of carbon, including graphite, carbon black and charcoal. Preferred non-porous core materials are tungsten carbamide, tungsten, steel and titanium beads such as stainless steel beads.

The porous material is a polymeric base matrix used as a means for covering and keeping multiple (or a single) core materials together and as a means for binding the adsorbing ligand.

The polymeric base matrix may be sought among certain types of natural or synthetic organic polymers, typically selected from i) natural and synthetic polysaccharides and other carbohydrate based polymers, including agar, alginate, carrageenan, guar gum, gum arabic, gum ghatti, gum tragacanth, karaya gum, locust bean gum, xanthan gum, agaroses, celluloses, pectins, mucins, dextrans, starches, heparins, chitosans, hydroxy starches, hydroxypropyl starches, carboxymethyl starches, hydroxyethyl celluloses, hydroxypropyl celluloses, and carboxymethyl celluloses; ii) synthetic organic polymers and monomers resulting in polymers, including acrylic polymers, polyamides, polyimides, polyesters, polyethers, polymeric vinyl compounds, polyalkenes, and substituted derivatives thereof, as well as copolymers comprising more than one such polymer functionally, and substituted derivatives thereof; and iii) mixture thereof.

A preferred group of polymeric base matrices are polysaccharides such as agarose.

From a productivity point of view it is important that the adsorbent is able to bind a high amount of the biomolecular substance per volume unit of the adsorbent. Thus we have found that it is preferable to apply adsorbents having a polymeric phase (i.e. the permeable backbone where the ligand is positioned and whereto the actual adsorption is taking place) which constitutes at least 50% of the adsorbent particle volume, preferably at least 70%, more preferably at least 80% and most preferably at least 90% of the volume of the adsorbent particles.

The investigators of the present invention have found that in order to ensure an efficient adsorption at high flow rates it is necessary to minimise the mean particle diameter of the adsorbent particle. Thus, in a preferred embodiment of the present invention the adsorbent particle has a particle size of at the most 150 µm, typically a particle size in the range of about 40 µm to 150 µm. The adsorbent particle typically has a mean particle size of at most 120 µm, particularly at most 100 µm, more preferably at most 90 µm, 80 µm or 75 µm most preferably about 70 µm.

The particles size analysis performed and referred to throughout the description and the examples is based on an computerised image analysis of the bead population giving the number of particles at any given particle diameter in relation to the total number of particles analysed in the specific measurement. Typically the total number of particles analysed will be in the range of 250-500 particles). These particle size data may be transferred into the volume percent represented by each particle size by a routine mathematical transformation of the data, calculating the volume of each bead and relating this to the total volume occupied by all beads counted in the measurement.

The particle size distribution according to the invention is preferably defined so that more than 90% of the particles are found between 20-500% of the mean particle diameter, more preferable between 50-200% of the mean particle diameter, most preferable between 50-150% of the mean particle diameter.

The preferred shape of a single adsorbent particle is substantially spherical. The overall shape of the particles is, however, normally not extremely critical, thus, the particles can have other types of rounded shapes, e.g. ellipsoid, droplet and bean forms. However, for certain applications (e.g. when the particles are used in a fluidised bed set-up), it is preferred that at least 95% of the particles are substantially spherical.

Preparation of the particulate material according to the invention may be performed by various methods known per se (e.g. by conventional processes known for the person skilled in the art, see e.g. EP 0 538 350 B1 or WO 97/17132. For example, by block polymerisation of monomers; suspension polymerisation of monomers; block or suspension gelation of gel-forming materials, e.g. by heating and cooling (e.g. of agarose) or by addition of gelation "catalysts" (e.g.

adding a suitable metal ion to alginates or carrageenans); block or suspension cross-linking of suitable materials (e.g. cross linking of dextrans, celluloses, or starches or gelatines, or other organic polymers with e.g. epichlorohydrin or divinyl sulphone); formation of silica polymers by acidification of silica solutions (e.g. block or suspension solutions); mixed procedures e.g. polymerisation and gelation; spraying procedures; and fluid bed coating of density controlling particles; cooling emulsions of density controlling particles suspended in polymeric base matrices in heated oil solvents; or by suspending density controlling particles and active substance in a suitable monomer or copolymer solution followed by polymerisation.

In a particularly suitable embodiment generally applicable for the preparation of the particulate material according to the invention, a particulate material comprising agarose as the polymeric base matrix and steel beads as the core material is obtained by heating a mixture of agarose in water (to about 95° C.), adding the steel beads to the mixture and transferring the mixture to a hot oil (e.g. vegetable oils), emulsifying the mixture by vigorous stirring (optionally by adding a conventional emulsifier) and cooling the mixture. It will be appreciated by the person skilled in the art that the particle size (i.e. the amount of polymeric base matrix (here: agarose) which is incorporated in each particle can be adjusted by varying the speed of the mixer and the cooling process. Typically, following the primary production of a particle preparation the particle size distribution may be further defined by sieving and/or fluid bed elutriation.

The porous matrix, such as polymer agarose, is typically chemically derivatised with a low molecular weight compound referred to herein as the ligand and the adsorbent comprise a ligand with affinity to proteins. The ligand constitutes the adsorbing functionality of the adsorbent media or the polymeric backbone of the adsorbent particle has a binding functionality incorporated per se. Well-known ligand chemistries such as cation exchangers, e.g. sulphonic acid, have been proven to be efficient tools for purification of whey proteins such as lactoferrin and lactoperoxidase. These proteins are positively charged, even at neutral pH, and selective interaction with a cation exchanger can be obtained. Other proteins require more sophisticated binding interaction with the ligand in order to obtain a selective adsorption.

Such affinity ligands, like the chargeable moieties, may be linked to the base matrix by methods known to the person skilled in the art, e.g. as described in "Immobilized Affinity Ligand Techniques" by Hermanson et al., Academic Press, Inc., San Diego, 1992. In cases where the polymeric base matrix do not have the properties to function as an active substance, the polymeric base matrix (or matrices where a mixture of polymers are used) may be derivatised to function as an active substances in the procedures of activation or derivatisation. Thus, materials comprising hydroxyl, amino, amide, carboxyl or thiol groups may be activated or derivatised using various activating chemicals, e.g. chemicals such as cyanogen bromide, divinyl sulfone, epichlorohydrin, bisepoxyranes, dibromopropanol, glutaric dialdehyde, carbodiimides, anhydrides, hydrazines, periodates, benzoquinones, triazines, tosylates, tresylates, and diazonium ions.

Specifically preferred methods for chemical derivatization and specific ligands applicable according to this invention is described in WO 98/08603.

In order to ensure an optimal adsorption strength and productivity of the adsorbent it has been found that the ligand concentration on the adsorbent is very significant. Thus, in a suitable embodiment, the adsorbent carries ligands for adsorption of the biomolecular substances in a concentration of at least 20 nM, such as at least 30 mM or at least 40 mM, preferably at least 50 mM and most preferably at least 60 mM.

A subset of adsorbents may be characterised in terms of their binding capacity to bovine serum albumin (BSA). This subset of adsorbents are typically those comprising a ligand selected from the group consisting of i) ligands comprising aromatic or heteroaromatic groups (radicals) of the following types as functional groups: benzoic acids such as 2-aminobenzoic acids, 3-aminobenzoic acids, 4-aminobenzoic acids, 2-mercaptobenzoic acids, 4-amino-2-chlorobenzoic acid, 2-amino-5-chlorobenzoic acid, 2-amino-4-chlorobenzoic acid, 4-aminosalicylic acids, 5-aminosalicylic acids, 3,4-diaminobenzoic acids, 3,5-diaminobenzoic acid, 5-aminoisophthalic acid, 4-aminophthalic acid; cinnamic acids such as hydroxy-cinnamic acids; nicotinic acids such as 2-mercaptonicotinic acids; naphthoic acids such as 2-hydroxy-1-naphthoic acid; quinolines such as 2-mercaptoquinoline; tetrazolacetic acids such as 5-mercapto-1-tetrazolacetic acid; thiadiazols such as 2-mercapto-5-methyl-1,3,4-thiadiazol; benzimidazols such as 2-amino-benzimidazol, 2-mercaptobenzimidazol, and 2-mercapto-5-nitrobenzimidazol; benzothiazols such as 2-aminobenzothiazol, 2-amino-6-nitrobenzothiazol, 2-mercaptobenzothiazol and 2-mercapto-6-ethoxybenzothiazol; benzoxazols such as 2-mercaptobenzoxazol; thiophenols such as thiophenol and 2-aminothiophenol; 2-(4-aminophenylthio)acetic acid; aromatic or heteroaromatic sulfonic acids and phosphonic acids, such as 1-amino-2-naphthol-4-sulfonic acid and phenols such as 2-amino-4-nitro-phenol. It should be noted that the case where M is agarose, SP1 is derived from vinyl sulfone, and L is 4-aminobenzoic acid is specifically disclaimed in relation to the solid phase matrices according to the invention, cf. WO 92/16292, most preferably amino-benzoic acids like 2-amino-benzoic acid, 2-mercapto-benzoic acid, 3-aminobenzoic acid, 4-aminobenzoic acid, 4-amino-2-chlorobenzoic acid, 2-amino-5-chlorobenzoic acid, 2-amino-4-chlorobenzoic acid, 4-aminosalicylic acids, 5-aminosalicylic acids, 3,4-diaminobenzoic acids, 3,5-diaminobenzoic acid, 5-5-aminoisophthalic acid, 4-aminophthalic acid; ii) ligands comprising 2-hydroxy-cinnamic acids, 3-hydroxy-cinnamic acid and 4-hydroxy-cinnamic acid iii) ligands comprising a carboxylic acid and an amino group as substituents such as 2-amino-nicotinic acid, 2-mercapto-nicotinic acid, 6-aminonicotinic acid and 2-amino-4-hydroxypyrimidine-carboxylic acid iv) ligand comprising radicals derived from a benzene ring fused with a heteroaromatic ring system, e.g. a ligand selected from benzimidazoles such as 2-mercapto-benzimidazol and 2-mercapto-5-nitro-benzimidazol; benzothiazols such as 2-amino-6-nitrobenzothiazol, 2-mercaptobenzothiazol and 2-mercapto-6-ethoxybenzothiazol; benzoxazols such as 2-mercaptobenzoxazol;and v) ligands chosen from the group of thiophenols such as thiophenol and 2-aminothiophenol.

Within the embodiment wherein the ligand is selected from group i)-v), the adsorbents typically have a dynamic binding capacity of at least 10 g of biomolecular substance per liter, more preferably at least 20 g per liter, still more preferable at least 30 g per liter when tested according to the process conditions used in the relevant application. The binding capacity of the adsorbent may be determined in terms of its binding capacity to bovine serum albumin (BSA). The binding capacity is typically such that at least 10 g/L of BSA binds according to test Method A.

Method A is a method used for determination of the bovine albumin binding capacity of selected adsorbents consisting of the following process:

Bovine serum albumin solution pH 4.0 (BSA pH 4.0): Purified bovine serum albumin (A 7906, Sigma, USA) is dissolved to a final concentration of 2 mg/ml in 20 mM sodium citrate pH 4.0. Adsorbents are washed with 50 volumes of 20 mM sodium citrate pH 4.0 and drained on a suction filter.

A sample of 1.0 ml suction drained adsorbent is placed in a 50 ml test tube followed by the addition of 30 ml of BSA, pH 4.0.

The test tube is then closed with a stopper and the suspension incubated on a roller mixer for 2 hours at room temperature (20-25° C.). The test tube is then centrifuged for 5 min. at 2000 RPM in order to sediment the adsorbent completely. The supernatant is then isolated from the adsorbent by pipetting into a separate test tube, avoiding the carry-over of any adsorbent particles and filtered through a small non-adsorbing 0.2 µm filtre (Millipore, USA). Following this a determination of the concentration of non-bound BSA in the supernatant is performed by measuring the optical density (OD) at 280 nm on a spectrophotometer.

The amount of BSA bound to the adsorbent is then calculated according to the following formula:

mg $BSA$ bound per ml suction drained adsorbent=(1−(OD of test supernatant/OD of $BSA$ starting solution))×60 mg $BSA$/ml adsorbent.

Washing

In a preferred embodiment the washing liquid is water e.g. tap water, demineralised water, water produced by reverse osmosis or distilled water.

In a particularly interesting embodiment of the invention, the washing and eluting step is combined into one step, wherein it is one and the same liquid that is employed for washing out the impurities as well as subsequently eluting the product.

In a preferred embodiment of the present invention the flow rate used for the washing steps involved is selected from the ranges outlined previously for applying the protein-containing mixture to the adsorbent column.

Elution

The biomolecular substances of interest are released from the adsorbent medium by using an elution buffer, which produces a generally clear and concentrated solution of product.

In order to obtain the purified protein or proteins to be isolated the elution may be performed by any method conventionally described and known in the prior art.

In an alternative and very suitable embodiment of the present invention, the elution of the adsorbed protein is performed with a solution, typically selected from the group consisting of dilute base, dilute acid, and water. In the embodiment wherein the eluting or washing step is performed with such a solution, the solution is dilute so as to minimise the amount of salt and other unwanted substances present in the eluted product.

Thus, in a preferred embodiment the dilute acid or base used for elution of the biomolecular substance has a salt concentration of less than 50 mM, preferably less than 30 mM, even more preferable less than 20 mM. The determination of the salt concentration is performed directly on the eluate fraction containing the protein or proteins to be isolated without additional dilution of the eluate fraction. Common, low cost and non-toxic acids and bases are applicable. Specifically preferred are the bases sodium hydroxide (NaOH), potassium hydroxide (KOH), calcium hydroxide ($Ca(OH)_2$), ammonium hydroxide ($NH_4OH$).

In a preferred embodiment of the present invention the flow rate used for the elution step or steps involved is selected from the ranges outlined previously for applying the protein-containing mixture to the adsorbent column.

The Product

In some instances, more than one molecule of interest is adsorbed to the adsorbent, and sequential elution may be performed in order to increase the number of products, i.e. one protein is released from the adsorbent in a way that the second protein remains adsorbed. Subsequently, the second protein is released under altered conditions, such as an alternative eluent.

In the present context, the term "protein" and the term "biomolecular substance" are used interchangeable and relates to a compound of biological origin comprising at least two amino acids, such as peptide, polypeptide, lipoprotein, lipopolypeptide, glycopeptide, glycoprotein, enzyme, antibody and immunoglubulin.

In a preferred embodiment of the present invention the protein isolated from the protein-containing mixture is selected form the group consisting of lactoperoxidase, lactoferrin, bovine serum albumin, β-lactoglobulin, immunoglobulin, α-lactalbumin and glycomacropeptid.

The process of the invention allows for eluates with high protein purity. At least one isolated protein fractionate comprises 70% w/w of the total protein, more preferably at least 80% of the total protein and most preferably at least 90% w/w of the total protein.

In a preferred embodiment of the present invention the purity of the protein to be isolated measured in the eluate is at least 65%, such as at least 75%, e.g. at least 85%, such as at least 90%, e.g. at least 95% such as at least 98%, e.g. 100%.

The eluate fraction containing the protein product needs to be further processed in order to obtain a powdered product. A small ultrafiltration unit concentrates the product from a dilute protein solution to a protein concentrate prior to drying. The choice of drying technique depends on the heat sensitivity of the specific protein.

Further Embodiments of the Present Invention

Figure 3:
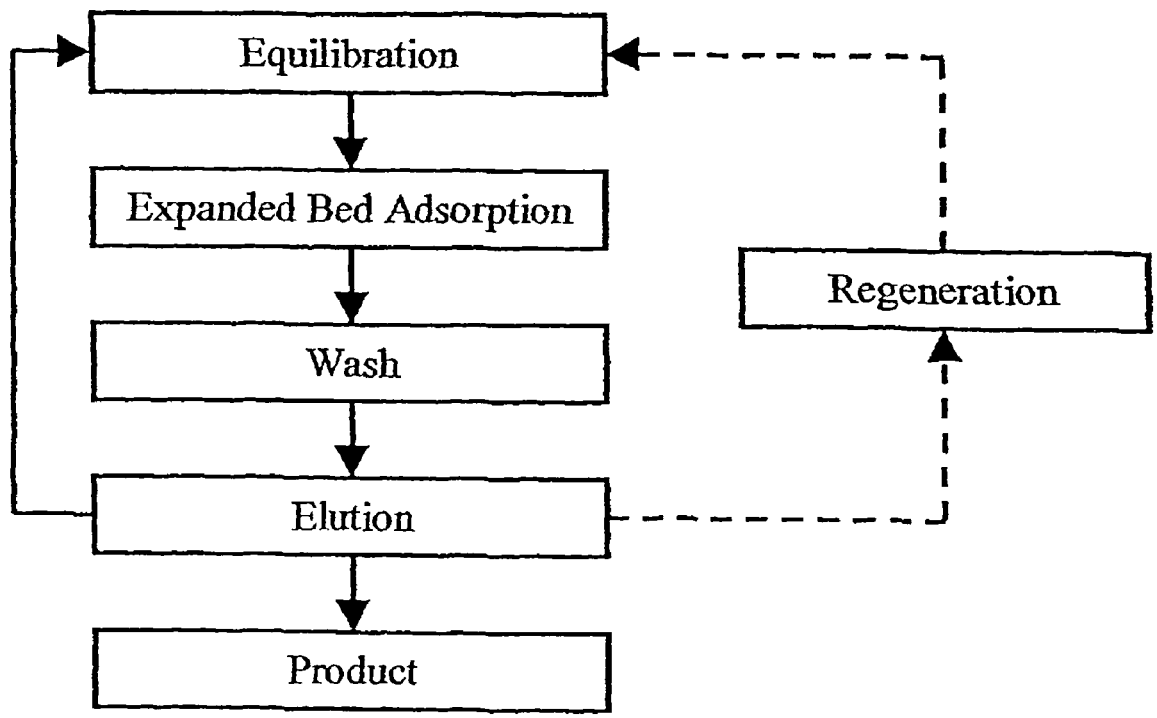
FIG. 3: Shows a modular whey Protein fractionation facility, capturing lactoferrin and lactoperoxidase in Step I, and bovine serum albumin, p-lactoglobulin and immunoglobulin in Step II.

A suitable embodiment of the EBA process for the isolation and fractionation of biomolecular substances from milk and whey according to the invention may be summarised by the FIG. 3 and the steps: equilibration (optional), application of milk derived raw material, wash (optional), and elution. Before starting the next process cycle, the adsorbent may be equilibrated again and/or regenerated at a certain frequency. During the entire process, the adsorbent is expanded by an upwards flow of liquid in the column i.e. the flow direction is not reversed during a process cycle.

In a further preferred embodiment the adsorbent comprise more than one population of particles, each population of particles having different densities, i.e. the adsorbent may be a mixture of two particle preparations having different particle size distributions and different densities. Preferably, in an adsorbent mixture of two separate populations the population of particles having the lowest mean particle size will have a higher density than the population of particles having the highest mean particle size. As a non-limiting example an adsorbent preparation may consist of a mixture of two populations of particles A and B, wherein particle population A has a mean particle size of 100 µm and a density of 2.5 g/ml, while particle population B has a mean particle size of 50 µm and a density of 4 g/ml. Such a mixed population of adsorbent particles have been shown to exhibit surprisingly high dynamic binding capacity (i.e. high binding efficiency) at flow rates above 10 cm/min (i.e. high productivity), while still being expanded to a degree below H/H0=5.0 or even below H/H0=3.0.

It is a further object of this invention to provide a process for isolation and fractionation of biomolecular substances from milk, skim milk, whey and other milk derived raw materials based on adsorption to any type of solid phase material of any shape and format including packed bed adsorption, batch adsorption, suspended bed adsorption, EBA and membrane based adsorption characterised by the use of specific process conditions enabling the elution of the bound substances from the adsorbent such that the final salt concentration in the eluate is kept below 50 mM salt.

Adsorptive processes are basically generally disclosed by the use of one adsorption step resulting in one or more isolated products. Although the technological possibility to use multiple consecutive adsorption steps on e.g. human serum is well known no such modular process flow sheets have been suggested or realised for the industrial isolation and fractionation of biomolecular substances from milk or milk derived raw materials. However, such a modular process concept is not yet known in the milk industry and the method of the invention is particularly amenable and highly attractive to the milk industry since there is a need to uncouple the production of one product from other products in order to obtain maximal flexibility in the production set up and thereby to be able to address fluctuating market needs and the possibility to make use of the non-bound fraction in a more flexible way (e.g. for the production of WPC or WPI products).

It is a further object of the present invention to provide a modular process for isolation and fractionation of biomolecular substances from milk, skim milk, whey and other milk derived raw materials based on adsorption to any type of solid phase material of any shape and format including packed bed adsorption, batch adsorption, suspended bed adsorption, EBA and membrane based adsorption characterised by the use of two or more consecutive but independently operated adsorption steps providing two or more purified biomolecular substances in amounts according to the individual and actual need for each substance.

A further aspect of the invention relates to a process featuring a modular process concept for optimal market adaptation and extension of the fractionation scheme.

Figure 2:
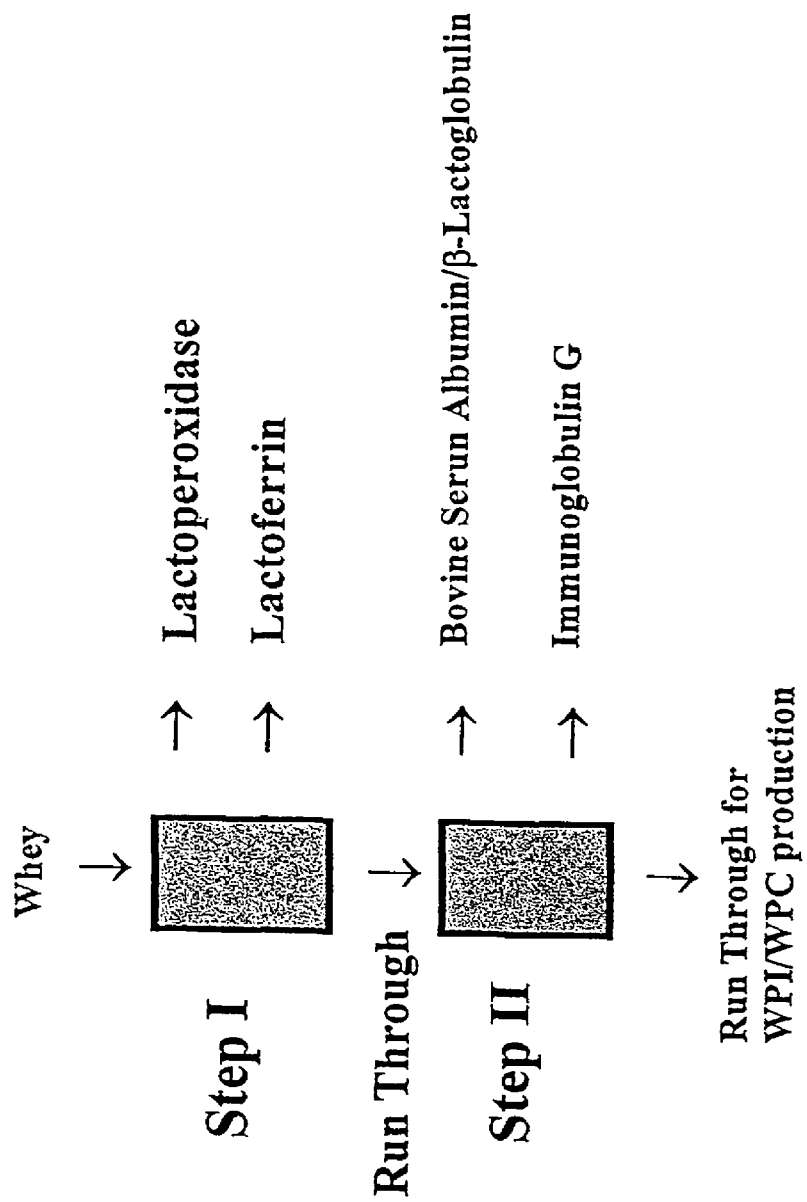
FIG. 2: Shows a flow sheet diagram of an EBA process according to the invention.

A suitable embodiment of the modular process of the present invention is exemplified by FIG. 2, relating for illustrative purposes to a whey protein fractionation facility: Lactoferrin and lactoperoxidase may be adsorbed to Column I. The run-through from Step I contains the remaining whey proteins, and Step II captures the immunoglobulin fraction from the run-through. Thus, the run-through from Step II contains the major portion of the whey proteins that can be further utilised in a WPC or WPI production. The pH-dependent binding chemistry in Step II also enables the extraction of bovine albumin and β-lactoglobulin.

In each step, the number and size of columns connected in parallel may be adjusted in order to obtain optimal market adaptation. Also, extension of a fractionation facility is possible so that new proteins of interest can be isolated. This is accomplished by adding another column set with the appropriate ligand chemistry for further selective protein extraction from the run through fraction.

In the modular process, at least one adsorbent comprises a polymeric material.

It is a particular object of this invention to provide a modular process for the production of purified lactoperoxidase, lactoferrin, β-lactoglobulin, bovine albumin, immunglobulin G, α-lactalbumin and glycomacropeptide from milk, skim milk, whey and other milk derived raw materials, which process comprises at least two consecutive adsorption steps wherein the first adsorption step provides purified lactoperoxidase and lactoferrin and the second adsorption step provides beta-lactoglobulin, albumin and immunoglobulin G in one or more fractions.

The modular process comprises two or more modular units typically connected in series.

It is a further object of this invention to provide a process for the production of a mixture of immunoglobulin G, lactoferrin and lactoperoxidase in one adsorption step.

In an embodiment of the present invention the mixture comprises at least 2 proteins and said fractionation of the at least 2 proteins is performed using an expanded adsorbent bed or packed adsorbent bed or combinations thereof.

The fractionation is carried out with at least 2 adsorbents each placed in a modular unit.

The steps for fractionation of the proteins from the mixture comprises the steps of:
i) optionally adjusting the pH in the mixture;
ii) optionally equilibrating the adsorbent;
ii) applying the solution to the adsorbents;
iii) optionally washing with a liquid;
iv) eluting the adsorbed proteins with one or more eluents selected from the group consisting of dilute acid, dilute base and water;
vi) isolating at least one protein mixture comprising a single protein or various proteins.

In a further embodiment of the present invention, the modular process involves the in-line isolation of at least one of the proteins selected from the group consisting of lactoperoxidase, lactoferrin, bovine albumin, β-lactoglobulin, immunoglobulin α-lactalbumin and glycomacropeptide or mixtures thereof from a solution wherein said solution comprising at least one of the above mentioned proteins, said method comprises the steps of:
i) optionally adjusting the pH of the solution;
ii) applying said solution to an optionally equilibrated adsorption column comprising an adsorbent, said adsorbent comprises a particle with at least one high density non-porous core, surrounded by a porous material and the adsorbent has a particle density of at least 1.5 g/mL and mean particle size of at most 150 μm;
iii) optionally washing with a liquid:
iv) eluting at least one protein from each modular unit using one or more aqueous eluents and wherein the final concentration of salt in the eluate is kept below 50 mM.

In a preferred embodiment of the present invention a plug flow in the adsorbent layer present in the column is provided. This plug flow is established by supplying a layer of inert glass beads to the column and positioned in the stirred zone or in the area of the inlet of the column.

It is a further object of this invention to provide uses for isolated protein products produced by any of the invented production processes.

The present investigators have found that the preferred method for introducing intractable raw materials into a column is through relatively large openings. The fluid distribution in FastLine columns is based on a rotating sprinkler principle. An inlet valve for the raw material is located below the base of the column and the raw material enters the column through large diameter holes (3 mm) in the hollow arms of the sprinkler. When the process is running, the sprinkler gently rotates, creating a sweeping motion along the entire cross-section of the column. Due to the gentle stirring action of the sprinkler, the mixed zone in the expanded bed is limited to a narrow zone located at the bottom of the column, and plug-flow behaviour without back-mixing is obtained in the upper part of the column.

The column may be the UpFront's FastLine® column for EBA which is disclosed in co-pending application no. PCT/DK01/00332.

Other types of fluid bed columns have been described in WO 92/00799, WO 92/18237 and WO 99/65586.

The following examples and drawings will illustrate the invention further.

EXAMPLES

Example 1

Characteristics of an EBA Adsorbent.

This example describe the features of the adsorbent from UpFront Chromatography used in Example 2-19.

Figure 4:
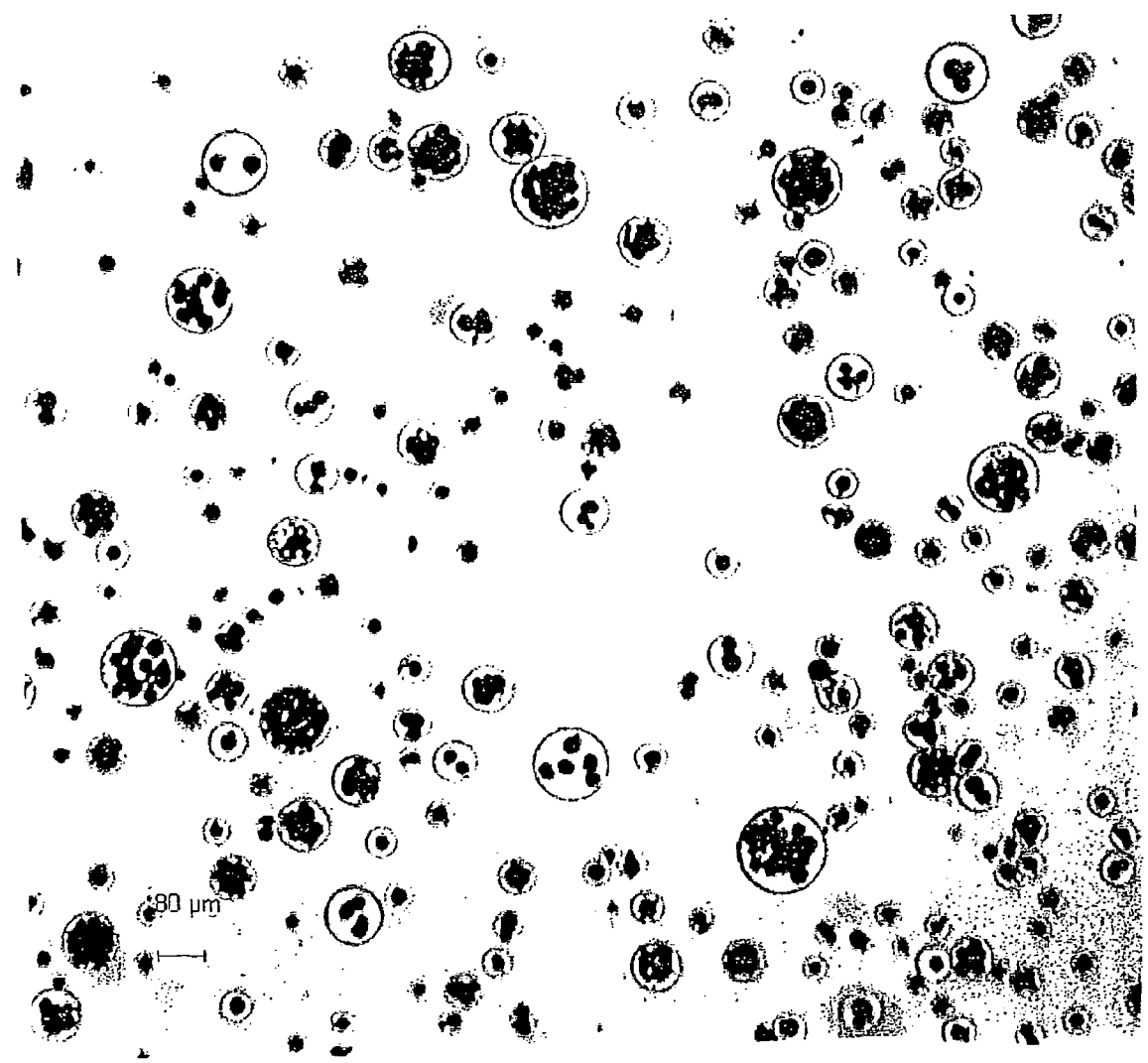
FIG. 4: Shows a microscope picture of stainless steel/agarose EBA adsorbent particles.

The term "UpFront Stainless Steel-Agarose" refers to adsorbent particles produced by an emulsification process as conceptually described in the description. They comprise a core material consisting of stainless steel beads (1-PSR 2, Anval, Sweden) sized in the range 22-44 µm. A layer of agarose ($^4$% agarose) surrounds the stainless steel core bead(s). The adsorbent particle population is sieved to get a particle size distribution in the range of 30-120 µm (see FIG. 4). The mean particle diameter has been determined to be 65 µm by a microscopic examination combined with image processing.

The particle population of the adsorbent comprises both composite particles having a pellicular structure (i.e. one steel bead embedded in the agarose polymeric phase) as well as conglomerate particles having more than one steel bead inside the agarose phase The density of the adsorbent particles was estimated to be 2.3 g/ml by the following method:

A sample of the "UpFront Stainless Steel-Agarose" adsorbent was washed carefully on a suction filter and hereafter drained for the interstitial water by gentle suction in 5 minutes. Hereafter 30,0 gram of the wet but suction drained adsorbent was weighed into a measuring cylinder followed by the addition of 50.0 ml water. After thorough mixing of the adsorbent particles with the added water the total volume (Vt) of the resulting suspension was read on the measuring cylinder. The density of the adsorbent particles was then calculated according to the formula:

$$d=30/(Vt-50) \text{g/ml}.$$

The volume fraction of the adsorbent particles that constitutes the agarose phase can be estimated by assuming an approximate density of the stainless steel beads to be 8.0 g/ml and the density of the agarose phase to be 1.0 g/ml. On these assumptions the volume fraction of the adsorbent particles constituted by the agarose phase will be approx. 81% v/v.

Example 2

Epoxy Activation and Cross-Linking of "UpFront Stainless Steel-Agarose" with a Poly-Epoxy Compound.

The adsorbent "UpFront Stainless Steel-Agarose" described in example 1 was chemically activated and cross-linked by the use of a polymeric epoxy compound "GE 100", HS code 2910 90 00, CAS-no.: 90529-77-4/25038-04-4 from RASCHIG GmbH, Ludwigshafen, Germany following the procedure below:

25 L of wet but suction drained "UpFront Stainless Steel-Agarose" was mixed with 20 L demineralised water, 10 kg sodium sulphate (water free), 2.5 L 32.5% (w/w) sodium hydroxide and 1.25 L "GE 100". The suspension was thoroughly mixed at room temperature for 1 hour. At this time another 1.25 L "GE 100" was added to the stirred suspension, followed by mixing at room temperature for another hour. The addition of 1.25 L "GE 100" followed by mixing for one hour was repeated for another three times, so that the suspension totally had been added 5×1.25 L "GE 100".

Following reaction with "GE 100" the adsorbent was washed with 250 L, hot (40° C.) water on a suction filter and 250 L water having room temperature.

Example 3

Preparation of a Sulfonic Acid Ion Exchanger with Butane Sultone.

The "GE-100" activated and cross-linked adsorbent prepared in Example 2 was further reacted with butane sultone to prepare a cation exchanger comprising sulfonic acid groups.

25 L "GE 100" reacted "UpFront Stainless Steel-Agarose" from Example 2 was washed on a suction filter with 50 L 32.5% w/w sodium hydroxide, followed by draining by gentle suction. The highly basic adsorbent cake was transferred into a jacketed and termostated reaction tank and added 15 L deionised water. The adsorbent was suspended in the aqueous phase by gentle stirring and the suspension was then heated to 70° C.

The suspension was then added 1 kg sodium dodecyl sulfate, which was dissolved under gentle stirring. While continuing stirring and maintaining the temperature close to 70° C. 1,4-butane sultone, code 13671, CAS No.: 1633-83-6, ORGANICA, Wolfen, Germany, was added in 8 portions each of 1.56 L butane sultone. In between each addition of the butane sultone the suspension was allowed to react under stirring for 20 min. Following the last addition of butane sultone the adsorbent suspension was stirred for another 20 min.

After reaction with butane sultone the adsorbent was again washed on a suction filter with 500 L water followed by washing in an expanded bed column (Ø=30 cm) with another 500 L water using a linear flow rate of 15 cm/min. The washed adsorbent now comprising cation exchanging sulfonic acid groups was then drained and stored in 20% ethanol. The contents of sulfonic acid groups covalently coupled to the agarose phase of the adsorbent was determined by acid-base titration to be 125 millimole per liter wet but drained adsorbent.

Example 4

Epichlorohydrin Activation of "UpFront Stainless Steel-Agarose"

30 L "UpFront Stainless Steel-Agarose" described in example 1 was washed with demineralised water and drained on a suction filter. The adsorbent cake was then transferred into a jacketed and termostated reaction tank and added 24 L deionised water. The adsorbent was suspended in the aqueous phase by gentle stirring and the suspension was then heated to 40° C. Following this 3 L 32.5% w/w sodium hydroxide and 3.8 L epichlorohydrin was added whereafter the suspension was stirred at 40° C. for 2 hours.

Following the reaction with epichlorohydrin the adsorbent was washed with 500 L deionised water at room temperature.

The content of epoxy groups was determined by titration with thiosulfate to correspond to 35 millimole per liter wet but drained adsorbent.

The epoxy activated adsorbent was then further reacted with a ligand as described in example 5.

Example 5

Coupling of 2-Mercapto-Benzoic Acid to Epoxy Activated Adsorbent.

The epichlorohydrin activated adsorbent produced according to example 4 was further reacted with the ligand 2-mercapto-benzoic acid by the following procedure. One liter of suction drained epoxy activated adsorbent was added 1 liter of a solution of 100 g/L 2-mercapto-benzoic acid titrated to pH 11 with 5 M sodium hydroxide. The adsorbent suspension was then mixed gently for 18 hours at room temperature, followed by washing with 20 liters of deionised water.

The amount of 2-mercapto-benzoic acid covalently coupled to the adsorbent was determined by acid-based titration to be 31 millimoles per liter wet but drained adsorbent.

Example 6

Coupling of 2-Mercapto-Nicotinic Acid.

The epichlorohydrin activated adsorbent produced according to Example 4 was further reacted with the ligand 2-mercapto-nicotinic acid by following the procedure described in Example 5.

The ligand concentration was determined to be 32 millimoles per liter drained adsorbent.

Example 7

EBA on Sweet Whey for Isolation and Purification of Lactoperoxidase and Lactoferrin An EBA column (diameter=2 cm), FastLine 20, cat. no.7020-0000, UpFront Chromatography A/S, Denmark, was placed on a magnetic stirrer and 15 mL demineralised water was added into the column. Solid glass beads 150-250 µm (K. Hoyer Christensen, Denmark) were added into the column until a packed bed height of 10 cm was reached followed by adding 10 cm packed bed height (31 ml) of the sulfonic acid cation exchanger prepared in example 3. The solid glass beads were added to function as a layer of inert beads positioned in the stirred zone at the bottom of the column throughout the process.

This may generally result in a more efficient exploitation of the adsorbent since a higher fraction of the adsorbent then will be positioned above the stirred zone (in the plug flow zone with minimal back-mixing) as compared to a setup without added glass beads at the bottom of the column.

The column was connected to a UV monitor (Amersham Pharmacia Biotec AB, Sweden, optical unit UV-1) and a recorder (Pharmacia Sweden, Pharmacia/LKB Rec.1). The magnetic stirrer (Janke & Kuinhel BMBH & Co., IKA MAG REO) was started and the column was washed for 15 minutes with tap water using a linear flow of 10 cm/min. A fresh sample of non-pasteurised bovine sweet whey (from the production of Mozarella cheese) was adjusted to pH 6.5 with 1 M NaOH (Merck cat. no. 1.06498) and 6.2 L whey was then loaded onto the column (adsorbent:whey ratio 1:200) using a linear flow of 7.5 cm/minute.

When all the whey was loaded the column was washed with tap water (conductivity 0.65 ms/cm) until the UV-baseline was reached on the recorder (2.0 AUFS). The degree of expansion of the adsorbent (H/H0, i.e. the expanded bed height at a given flow rate in relation to the packed bed height at zero flow) was recorded visually during the experiment.

Lactoperoxidase (LP), which had been bound to the adsorbent was then eluted with 25 mM $K_2HPO_4$ (Merck cat. no.1.05101), 0.3 M NaCl (Baker, cat.no.0319) pH adjusted to 6.5 with HCl (Merck cat no. 1.00316). The eluted LP peak was collected according to the recorded UV-signal. Lactoferrin (LF), which also was bound to the adsorbent together with LP was eluted with 20 mM NaOH (Merck cat. no. 1.06498) and the LP peak was collected according to the recorded UV-signal. Following elution pH in the LF eluate was adjusted to a pH between 6 and 8 with 1 M HCl (Merck cat 1.00316).

The yield of LP and LF was estimated by measuring the Optical Density, OD 280 nm, of the eluates on a Spectronic, Cecil CE2041, UV-spectrophotometer.

The yield of LP and LF in the eluates was then calculated using the following extinction coefficients for the two proteins:

Lactoperoxidase $E_{280,\ 1\ mg/ml,\ 1\ cm} = 1.2$

Lactoferrin $E_{280,\ 1\ mg/ml,\ 1\ cm} = 1.0$

Following this the yield of mg LP and mg LF per liter whey loaded could be calculated.

The purity of the eluates was determined by SDS Polyacrylamide electrophoresis using precast gels: SDS Page 4-20% Tris-Glycine Gel 1.0 mm cat. no.345-0033 BioRad, running buffer cat. no.EC2675 Invitrogen and sample buffer cat. no.EC2676, Invitrogen. The eluates and the crude whey raw material were diluted 1+1 with the non-reducing sample buffer and heated on a water bath at 100° C. for 5 minuets. 20 µl of each sample was loaded on the gel. The electrophoresis apparatus, BioRad, was connected to a power supply and the voltage was set to 200 volt. The power was turned off when the blue marker reached the bottom of the gel. The SDS gel was stained a Colloid Blue Staining Kit LC6025, Invitrogen for 18 hours on a shaking table and destained in water.

Dry matter in the eluates was determined by freeze drying (Hetosicc, Heto Holten Denmark), Before freeze drying, the eluates were dialysed against demineralised water at 4° C. in a ratio of 1 vol of eluate to 100 volumes of water. 4 changes of water over 2 days were performed before the eluate was freeze dried.

Conductivity after ended dialysis was measured (Crison conductimeter 525) and 50 ml of the dialysed eluate was freeze dried overnight. The dry matter was determined by weighing the residual.

Results:

| Expansion of matrix (incl. Inert glass beads) at a liner flow at 7.5 cm/min | | |
|---|---|---|
| Step | Expanded matrix H | Expansion H/H$_0$ |
| Load | 29 cm | 1.45 |
| Wash | 27 cm | 1.35 |
| LP elution | 27 cm | 1.35 |
| LF elution | 27 cm | 1.35 |

Packed bed height $H_0$ = 20 cm

Yields of LF and LP
 Measuring of OD 280 nm: Peak 1 (LP) 0.785
 Peak 2 (LF) 2.080
 Volume of eluates: Peak 1 (LP) 250 ml
 Peak 2 (LF) 200 ml Total Yield of LP and LF $$LP \frac{0.785 * 250ml}{1.2} = 164 \text{ mg LP}$$

$$LF \frac{2.080 * 200 \text{ ml}}{1} = 416 \text{ mg LF}$$

Yield of LP and LP per Liter Whey Loaded.

$$LP \frac{164 \text{ mg}}{6 \text{ liter}} = 27 \text{ mg LP/liter whey loaded}$$

$$LF \frac{416 \text{ mg}}{6 \text{ liter}} = 69 \text{ mg LF/liter whey loaded}$$

Freeze Drying of the Eluates:

Conductivity after ended dialysis LP eluate 20 μS

LF eluate 16 μS

Yield determined as dry matter LP 32 mg/L whey loaded

LF 63 mg/l whey loaded

As can be seen there is a good correspondence between the spectrophotometric determination of the yields and the yields determined by measuring the dry matter in each eluate.

Purity of Eluted LP and LF

Figure 5:
FIG. 5: Shows a SDS-PAGE illustrating the purity of lactoferrin and lactoperoxidase. Lane 1 illustrates the whey, lane 2 illustrates the wash, lane 3 illustrates the LP-eluate and lane 4 illustrates the LF-eluate.

The purity of the eluted proteins was determined by SDS-PAGE. As can be seen from FIG. 5 the eluted LP and LF has been isolated and purified very efficiently.

| Lane | | Purity |
|---|---|---|
| 1 | Whey | |
| 2 | Wash | |
| 3 | LP eluate | >70% |
| 4 | LF eluate | >90% |

EBA on sweet whey having different pH values during load.

Example 8

EBA on Sweet Whey Having Different ph Values During Load

Three experiments were performed labelled A, B and C. Three FastLine 20 columns were loaded with inert glass beads and active sulfonic acid ion exchanger. Each FastLine 20 column was packed with 10 cm inert glass beads and 5 cm packed bed height of the sulfonic acid cation exchanger prepared in Example 3.

For column A the non-pasteurised sweet whey (from the production of Mozarella cheese) was adjusted to pH 6.5, for column B to pH 7.0 and for column C the whey was adjusted to 7.5 using 1 M NaOH.

The experiments illustrate the effect of varying pH on yield and purity of the isolated lactoperoxidase and lactoferrin. The sweet whey was loaded on the column at a linear flow rate at 7.5 cm/min in a ratio between adsorbent and whey of 1:200. (materials and set up see Example 7.

| Column | Whey loaded at pH |
|---|---|
| A | 6.5 |
| B | 7.0 |
| C | 7.5 |

Results:

Yields from measuring of OD280 nm of eluates:

| Column | pH | Yield of LP per L whey loaded | Yield of LF per L whey loaded |
|---|---|---|---|
| A | 6.5 | 27 mg | 65 mg |
| B | 7.0 | 29 mg | 71 mg |
| C | 7.5 | 21 mg | 73 mg |

Determination of purity by SDS PAGE

| Column | pH | Purity of LP eluate | Purity of LF eluate |
|---|---|---|---|
| A | 6.5 | 80% | 95% |
| B | 7.0 | 70% | 90% |
| C | 7.5 | 65% | 90% |

Example 9

EBA on Sweet Whey. Variation of Flow Rate.

Four experiments were performed labelled A, B, C and D. The experiments illustrate the effect of varying the flow rate during load of the whey on the yield and purity of the isolated lactoperoxidase and lactoferrin.

Four columns were packed. Each FastLine 20 column was packed with 10 cm glass beads and 5 cm packed bed height of the sulfonic acid cation exchanger prepared in example 3.

Non-pasteurised sweet whey (from the production of Mozarella cheese) adjusted to pH 6.5 was loaded on the column in a ratio at 1:200 and 4 different columns were run with different linear flow. (materials and set up see example 7.

| Column | Linear flow |
|---|---|
| A | 7.5 cm/min |
| B | 10 cm/min |
| C | 15 cm/min |
| D | 25 cm/min |

Results:

Yield from measuring of OD280 of eluates.

| Column | Linear flow | Yield of LP per L whey loaded | Yield of LF per L whey loaded |
|---|---|---|---|
| A | 7.5 cm/min | 29 mg | 71 mg |
| B | 10 cm/min | 29 mg | 60 mg |
| C | 15 cm/min | 27 mg | 61 mg |
| D | 25 cm/min | 19 mg | 55 mg |

Determination of purity from SDS Page

| Column | Linear flow | Purity of LP eluate | Purity of LF eluate |
| --- | --- | --- | --- |
| A | 7.5 cm/min | 75% | 90% |
| B | 10 cm/min | 75% | 90% |
| C | 15 cm/min | 75% | 90% |
| D | 25 cm/min | 75% | 90% |

Example 10

EBA on Sweet Whey. Variation of Adsorbent:Whey Ratio.

Three experiments were performed labelled A, B and C. The experiments illustrate the effect of varying the ratio between the amount of adsorbent and the amount of whey loaded on the yield and purity of the isolated lactoperoxidase and lactoferrin.

Three FastLine 20 columns were packed. Each FastLine 20 column was packed with 10 cm glass beads and 5 cm packed bed height of the sulfonic acid cation exchanger prepared in Example 3.

The non-pasteurised sweet whey (from the production of Mozarella cheese) was adjusted to pH 6.5 and loaded on the column at a linear flow at 7.5 cm/min. Column A, B and C were loaded with whey in different ratio between matrix and whey (materials and set up see Example 7).

| Column | Ratio Matrix:whey |
| --- | --- |
| A | 1:200 |
| B | 1:300 |
| C | 1:400 |

Results:

Yield from measuring of OD280 of eluates.

| Column | Ratio | Yield of LP per L whey loaded | Yield of LF per L whey loaded |
| --- | --- | --- | --- |
| A | 1:200 | 27 mg | 65 mg |
| B | 1:300 | 31 mg | 52 mg |
| C | 1:400 | 35 mg | 40 mg |

Determination of purity from SDS Page

| Column | Ratio | Purity of LP eluate | Purity of LF eluate |
| --- | --- | --- | --- |
| A | 1:200 | 80% | 95% |
| B | 1:300 | 80% | 95% |
| C | 1:400 | 80% | 95% |

Example 11

EBA on Sweet Whey. Variation of Loading Temperature.

Three experiments were performed labelled A, B and C. The experiments illustrate the effect of varying the temperature during load of the whey on the yield and purity of the isolated lactoperoxidase and lactoferrin.

Three FastLine 20 columns were packed. Each FastLine 20 column was packed with 5 cm packed bed height of the sulfonic acid cation exchanger prepared in example 3 (i.e. no inert glass beads were added in these experiments).

The non-pasteurised sweet whey (from the production of Danbo cheese) was adjusted to pH 6.5 and loaded on column A at +4° C., on column B at 22° C. and at column C at 50° C. The whey was loaded with a linear flow rate of 7.5 cm/min and in a ratio between matrix and whey of 1:300. Expansion of the matrix was measured during the run (materials and set up see Example 7).

| Column | Loading temperature |
| --- | --- |
| A | +4° C. |
| B | +22° C. |
| C | +50° C. |

Results:

Yield from measuring of OD280 nm of eluates

| Column | Loading temperature | Yield of LP per L whey loaded | Yield of LF per L whey loaded |
| --- | --- | --- | --- |
| A | +4° C. | 14 mg | 15 mg |
| B | +22° C. | 12 mg | 30 mg |
| C | +50° C. | 19 mg | 19 mg |

Determination of purity from SDS Page

| Column | Loading temperature | Purity of LP eluate | Purity of LF eluate |
| --- | --- | --- | --- |
| A | +4° C. | 60% | 90% |
| B | +22° C. | 60% | 90% |
| C | +50° C. | 70% | 90% |

Determination of expansion during the run

| | Expanded to (H) | Expansion H/$H_0$ |
| --- | --- | --- |
| Column A | | |
| Load of whey | 22 cm | 4.4 |
| Wash | 16 cm | 3.2 |
| Elution | 14 cm | 2.8 |
| Column B | | |
| Load of whey | 14 cm | 2.8 |
| Wash | 10 cm | 2 |
| Elution | 10 cm | 2 |
| Column C | | |
| Load of whey | 12 cm | 2.4 |
| Wash | 13 cm | 2.6 |
| Elution | 14 cm | 2.8 |

Settled bed height $H_0$ = 5 cm

Example 12

EBA on Skim Milk.

This experiment illustrates the use of EBA according to the invention using skim milk as raw material.

A FastLine 20 column was packed with 10 cm inert glass beads and 5 cm packed bed height of the sulfonic acid cation exchanger prepared in Example 3. Skim milk (at its natural pH of 6.7) was loaded on the column at a linear flow at 10 cm/min and in a ratio between matrix and skim milk of 1:200. Expansion of the adsorbent was measured during the run (materials and set up see Example 7).

Results:

Yield from measuring of OD280 nm of the eluates.

| Yield of LP per L whey loaded | Yield of LF per L whey loaded |
|---|---|
| 54 mg | 125 mg |

Determination of purity from SDS Page

| Purity of LP eluate | Purity of LF eluate |
|---|---|
| 80% | 90% |

Determination of expansion during the run

|  | Expanded to (H) | Expansion $H/H_0$ |
|---|---|---|
| Load | 28 cm | 1.9 |
| Wash | 20 cm | 1.3 |
| Elution | 19 cm | 1.3 |

Settled bed height $H_0$ = 15 cm

Example 13

Packed Bed Isolation of Immunoglobulins from Whey: Binding of IgG to 2-Mercaptobenzoic Acid Resin Depending on the pH of the Whey Loaded onto the Adsorbent.

Bovine IgG can be isolated from acid or sweet whey by the use of the adsorbent coupled with the ligand 2-mercaptobenzoic acid described in example 5.

Five packed bed columns (diameter=0.5 cm) each containing 1 ml of adsorbent were equilibrated with 5 ml of demineralized water. Acid whey was adjusted to respectively pH 4.0, 4.5, 5.0, 5.5 and 6.0 and loaded to the columns. 20 ml whey of a given pH value was loaded onto each column.

The non-bound proteins were washed out with respectively 10 mM sodium citrate pH 4.0, 4.5, 5.0, 5.5 and 6.0 corresponding to the pH of the raw material used for that particular column. 7 ml washing buffer was used for each column.

All columns were eluted with 5 ml of 20 mM tris pH 9.5 followed by 5 ml of 20 mM potassium phosphate, 1 M sodium chloride pH 12.0.

The flow rate used during the entire process was 300 cm/hr.

The eluates were analyzed by SDS-PAGE to determine the qualitative composition of the bound proteins. SDS-PAGE: 4-20% gradient gel from Novex (USA). Non-reduced and Coomassie stained.

Figure 6:
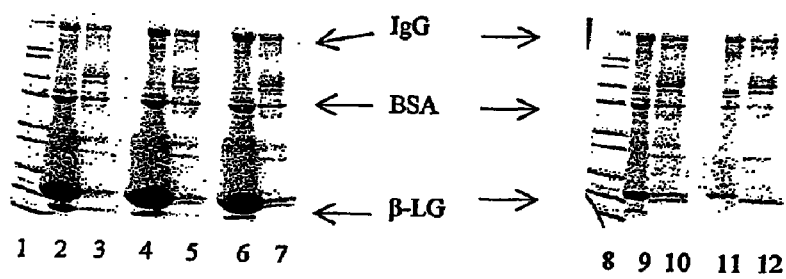
FIG. 6: Shows a SDS-PAGE illustrating the elution profiles of whey proteins as a function of binding pH. Lane 1 illustrates the molecular marker, lane 2 illustrates eluate 1 at pH 4, lane 3 illustrates eluate 2 at pH 4, lane 4 illustrates eluate 1 at pH 4.5, lane 5 illustrates eluate 2 at pH 4.5, lane 6 illustrates eluate 1 at pH 5, lane 7 illustrates eluate 2 at pH 5, lane 8 illustrates the molecular weight marker, lane 9 illustrates eluate 1 at pH 5.5, lane 10 illustrates eluate 2 at pH 5.5, lane 11 illustrates eluate 1 at pH 6 and lane 12 illustrates eluate 2 at pH 6.

Results:

The SDS-PAGE as shown in FIG. 6 illustrates the content of proteins in the two eluates obtained from column.

The SDS-PAGEs show that when the pH is increased in the whey loaded onto the column the binding capacity of IgG is decreased. The purity of the IgG increases when the pH in the loaded whey is increased. The optimum binding capacity of IgG is approx. pH 5.0.

Example 14

EBA. Isolation of Immunoglobulins from Whey Already Absorbed for Lactoferrin and Lactoperoxidase.

A 2 cm diameter EBA column, FastLine 20, from UpFront Chromatography A/S (Cat. no.: 7020-0000) was loaded with 10 cm packed bed height of inert glass beads and 15 cm (47.1 ml) of the adsorbent coupled with the ligand 2-mercaptobenzoic acid described in example 5. The glass beads (150-250 µm, density 2.5 g/ml) are used as a filler in the bottom of the column where the stirrer is rotating. The mixed zone created by the magnet occurs in the glass bead layer resulting in a perfect plug flow through the active adsorbent.

The column was equilibrated with 236 ml of demineralized water. Sweet whey depleted for lactoferrin and lactoperoxidase i.e. run through from a cation exchanger column procedure as described in example 7 was pH-adjusted to pH 4.9 with 1 M HCl. The column was loaded with 942 ml of the pH adjusted whey i.e. an adsorbent: whey ratio of 1:20. The flow rate during the whole process was 450 cm/hr=1.4 l/hr.

After loading of the whey non-bound proteins were washed out with 530 ml demineralized water.

After washing out non-bound proteins with demineralized water, the column was washed with 2.5 mg/ml caprylic acid pH 6.0. Volume of wash with 2.5 mg/ml caprylic acid pH 6.0: 471 mL.

The bound IgG was then eluted with 20 mM NaOH. The raw material, the washing fraction with caprylic acid and the eluate was analysed by SDS PAGE. SDS-PAGE: 4-20% gradient gel from Novex (USA). Non-reduced and Coomassie stained. 25 µl sample in each well.

Figure 7:
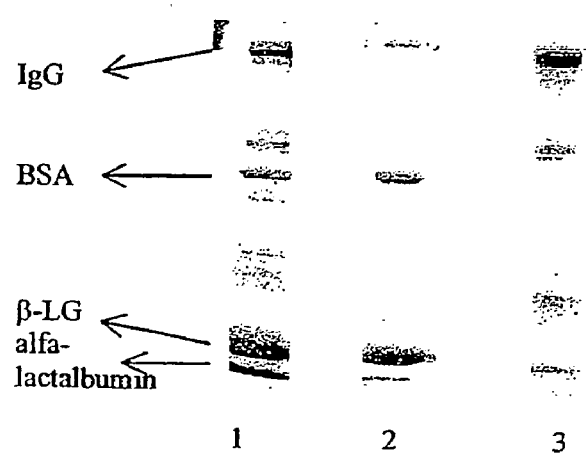
FIG. 7: Shows a SDS-PAGE showing purity of BSA/β-LG and IgG fractions. Lane 1 illustrates whey (LF and LP depleted), lane 2 illustrates the wash with 2.5 mg/ml caprylic acid pH 6 and lane 3 illustrates the eluate, eluted with 20 mM NaOH (170 ml).

Results:

The SDS-PAGE shown in FIG. 7 illustrates the content of proteins in the raw material, wash fraction with caprylic acid and in the eluate.

As can be seen from the figure the wash fraction with caprylic acid constitutes a purified solution of beta-lactoglobulin (β-LG) and bovine albumin (BSA). No alfa-lactalbumin is present in this fraction. It can further be seen that the eluate fraction constitutes a highly purified IgG containing only minor impurities of other milk protein components (estimated purity >85%).

Example 15

EBA Isolation of Immunoglobulins from Whey and Recovery of Pure β-Lactoglobulin:

As illustrated in Example 14 the adsorbent coupled with the ligand 2-mercaptobenzoic acid produced as described in example 5 also binds BSA and beta-lactoglobulin (β-LG) at pH 4.9. This experiment illustrates that with certain washing buffers it is possible to obtain a fraction of pure β-LG, a fraction comprising both β-LG and BSA and an elution fraction containing mainly IgG.

An experiment was carried out according to example 14 with the following modifications: After washing out non-bound proteins with demineralized water the column was further washed with 50 mM sodium acetate pH 5.5. Volume of wash with sodium acetate: 471 ml. The column was then further washed with 2.5 mg/ml caprylic acid pH 6.0.

Volume of wash with caprylic acid: 330 ml.

The IgG was finally eluted with 20 mM NaOH.

All fractions were analyzed by SDS PAGE. SDS-PAGE: 4-20% gradient gel from Novex (USA). Non-reduced and coomassie stained. 25 μl sample in each well.

Figure 8:
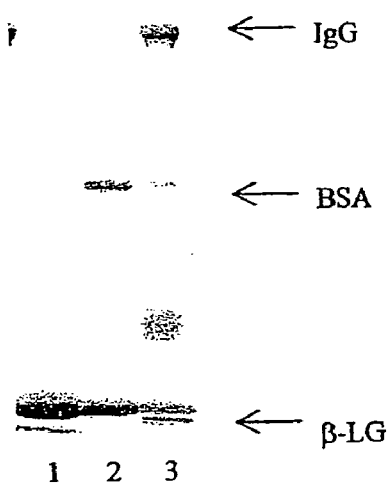
FIG. 8: Shows a SDS-PAGE showing the results obtained by the sequential washing/elution of β-LG and BSA and the final elution of IgG. Lane 1 illustrates wash with 50 mM sodium acetate pH 5.5, lane 2 illustrates the wash with 2.5 mg/ml caprylic acid pH 6 and lane 3 illustrates the eluate, eluted with 20 mM NaOH.

Results:

The SDS-PAGE shown in FIG. 8 illustrates the content of proteins in the two washes and the eluate.

The SDS-PAGE shows that washing with 50 mM sodium acetate pH 5.5 results in a fraction containing pure β-LG (lane #1). Wash with 2.5 mg/ml caprylic acid pH 6.0 results in a fraction containing BSA and β-LG (lane #2). The eluate (235 ml) contains a highly purified IgG (estimated purity >65%)

Example 16

EBA Isolation of Immunoglobulins from Whey: Capacity and Yield of at Different Adsorbent: Whey Ratios.

The adsorbent: whey ratio (liters of whey loaded per liter adsorbent) was varied to find the capacity of the matrix-and optimal yield of IgG per liter whey.

Experiment was carried out according to example 14 with the following modificaiotns.

In three conseqtive-experiments the EBA column was loaded with 707 ml, 942 ml and 1,413 ml respectively of sweet whey (from the production of Mozarella cheese) adjusted to pH 4.9 resulting in adsorbent:whey ratios (v/v) of 1:15, 1:20 and 1:30 respectively. After load the columns were washed with 2.5 mg/ml caprylic acid pH 6.0.

Volume of wash for all three columns: 530 ml. Flow rate for all three columns: 450 cm/hr=1.4 l/hr.

The IgG was eluted by 20 mM NaOH.

Results:

The table below shows the capacity and yield obtained with the 2-mercaptobenzoic acid adsorbent at different whey ratios.

The amount of IgG was calculated from spectrophotometrical measurements on the eluates at 280 nm using an extinction coefficient of $E^{1\%}_{280\ nm}=13$. The volumes of the eluates were respectively 170 ml, 174 and 226 ml.

| Whey ratio, l/l resin | mg IgG in eluate | Capacity, mg IgG/ml resin | Yield, mg IgG/l whey |
|---|---|---|---|
| 15 | 331 | 7 | 468 |
| 20 | 395 | 8.4 | 419 |
| 30 | 578 | 12.3 | 409 |

The above table shows that the highest yield per liter whey is obtained at a whey ratio of 1:15 resulting in 468 mg IgG/mi whey.

The capacity of the resin increases by 75% when the whey ratio is increased from 15 to 30 liter whey loaded per liter resin.

Example 17

EBA Isolation of Immunoglobulins from Whey: Capacity and Yield as a Function of Flow Rates During Load of Whey:

Experiments were carried out as described in example 14 with the following modifications. In three conseqvtive experiments the flow rates used during loading of the raw material (sweet whey, from the production of Mozarella cheese adjusted to pH 4.9) were respectively 300, 450 and 600 cm/hr.

After loading, the columns were washed with 2.5 mg/ml caprylic acid pH 6.0.

Volume of wash for all three columns: 530 ml. Flow rate during wash for all three columns: 450 cm/hr=1.4 l/hr.

The IgG was then eluted with 20 mM NaOH using a flow rate 450 cm/hr=1.4 l/hr for all three columns.

Results:

Expansion during load of the three columns was respectively 1.7 (300 cm/hr), 2 (450 cm/hr) and 2.3 (600 cm/hr).

The table below shows the capacity and yield obtained with the 2-mercaptobenzoic acid adsorbent at different flow rates used during load of the whey.

The amount of IgG was calculated from spectrophotometrical measurements at 280 nm. Volumes of the eluates were respectively 212 ml, 175 ml, and 156 ml.

| Flow rate, during whey load, cm/hour | mg IgG in eluate | Capacity, mg IgG/ml resin | Yield, mg IgG/l whey |
|---|---|---|---|
| 300 | 430 | 9.1 | 457 |
| 450 | 395 | 8.4 | 419 |
| 600 | 293 | 6.2 | 311 |

The table shows that the highest yield per liter whey applied is obtained at a flow rate of 300 cm/hr during load of 457 mg IgG/ml whey.

The capacity of the resin is decreased by approximately 30% from 9.1 to 6.2 mg IgG/ml resin when the flow rate is increased from 300 to 600 cm/hr.

Example 18

Integrated Modular EBA Process for Purification of LP, LF and IgG from Whey:

This Example illustrates that it is possible to isolate LP, LF and IgG with the two step process design shown in FIG. 2, where the pH of the effluent from the first step is adjusted to pH 4.9 before entering the second step.

The 2 columns used for this integrated process were 30 cm EBA columns (FastLine 300) from UpFront Chromatography A/S (cat. no.: 7300-0000).

Column No. 1: Purification of LP and LF

Bed height: 10 cm of inert glass particles, 15 cm of the sulfonic acid cation exchanger (10.6 l) described in Example 3.

The experiment was otherwise carried out according to example 7 with the following modifications.

Volume of equilibration: 53 l.

Whey load: 3180 L=adsorbent:whey ratio 1:300.

Volume of wash with water: 160 l.

Flow rate during load and wash: 900 cm/hr.

Volume of LP eluate: 101 l.

Volume of LF eluate: 55 l.

Flow rate during elution: 450 cm/min.

The effluent from column 1 is in-line pH adjusted to 4.9 before loaded onto column 2.

Column No. 2: Isolation of IgG

Bed height: 10 cm of inert glass particles, 15 cm of 2-mercaptobenzoic acid resin (10.6 l) described in example 5.

The experiment was otherwise carried out according to example 14.

Volume of equilibration: 30 l
Whey load: 212 L=ratio 1:20.
Volume of wash with water: 160 l.
Volume of wash with 2.5 mg/ml caprylic acid: 120 l.
Volume of IgG eluate: 40 l.
Flow rate during the whole process: 450 cm/hr.

Results:

The table below shows the yield and purity of the three proteins recovered from the two step process design.

The amounts of LP, LF and IgG in each eluate were calculated from spectrophotometrical measurements on the eluates at 280 nm using $E^{1\%}_{280,LP}=12$. $E^{1\%}_{280,LF}=10$ $E^{1\%}_{280,IgG}=13$

| Protein | g protein in eluate | Yield, mg protein/l whey | Purity, % |
|---|---|---|---|
| LP | 92 | 31 | >90% |
| LF | 235 | 80 | >90% |
| IgG | 89 | 419 | 80-85% |

Example 19

Production Estimates.

The following are calculations and production estimates based on the results obtained during the work with the described adsorbents.

A fractionation facility as described in Example 18 with two large scale columns in Step I (Ø=1.5 meter), each containing 265 liters of adsorbent, can extract lactoferrin and lactoperoxidase from a 690,000 liter whey stream per day (24 hours). The approximate productivity is 21 kg lactoperoxidase and 52 kg lactoferrin per day corresponding to an extraction yield of 30 mg lactoperoxidase and 75 mg lactoferrin per liter whey. Both products feature high purity (>90% purity).

Immunoglobulin is present in whey in a significantly higher concentration (0.5-1.0 g/l whey) than lactoferrin and lactoperoxidase. Thus, more columns are needed in Step II in order to extract immunoglobulin from the whey. A 690,000 liter whey stream per day occupies three columns (Ø=1.5 meter) each containing 265 liters of adsorbent media. The productivity is approximately 277 kg immunoglobulin per day, corresponding to an extraction yield of 400 mg immunoglobulin per liter whey.

Variations in productivity according to whey type and pretreatment of the whey may occur. All the productivity estimates stated here are based on results from pilot scale trials.

Example 20

EBA Adsorbents Comprising Tungsten Carbide Particles of 8 Micron Particle Size.

Figure 9:
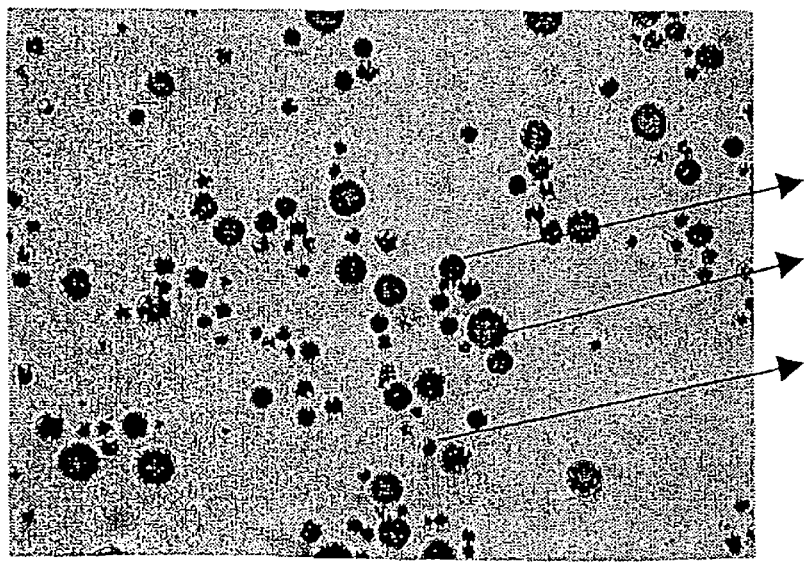
FIG. 9: Shows microscope picture of spherical UpFront tungsten carbide-8-agarose particles. The mean particle size is 59 μm and the density is 3.3 g/ml.

The term "UpFront tungsten carbide-8-agarose" refers to adsorbent particles produced by an emulsification process (tungsten carbide particles/melted agarose suspension emulsified in hot Vaseline oil followed by cooling, washing of the resulting agarose/tungsten carbide beads and sieving). They comprise a core material of tungsten carbide particles (WC 8.0, Kennametal Hertel, Germany) sized at 8 μm and a density of 15.6 g/ml. The adsorbent particles comprise the tungsten carbide particles as a high density core evenly distributed in the spherical agarose bead (see FIG. 9). For comparative purposes three different preparations were analysed with respect to expansion as a function of flow rate in an EBA column.

Figure 10A:
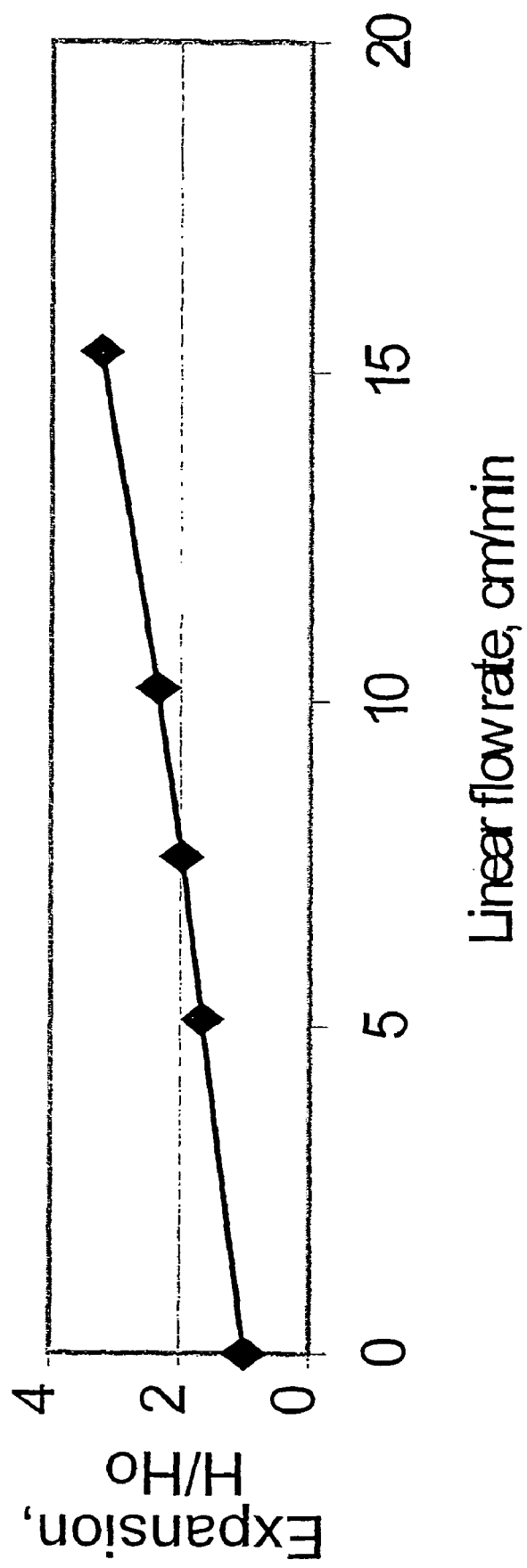
FIG. 10: Shows the expansion curve for three different tungsten carbide 8-agarose particles. A) density 2.4 g/ml and mean particle size 56 μm, B) density 3.3 g/ml and mean particle size 59 μm and C) density 3.2 g/ml and mean particle size 90 μm.
Figure 10B:
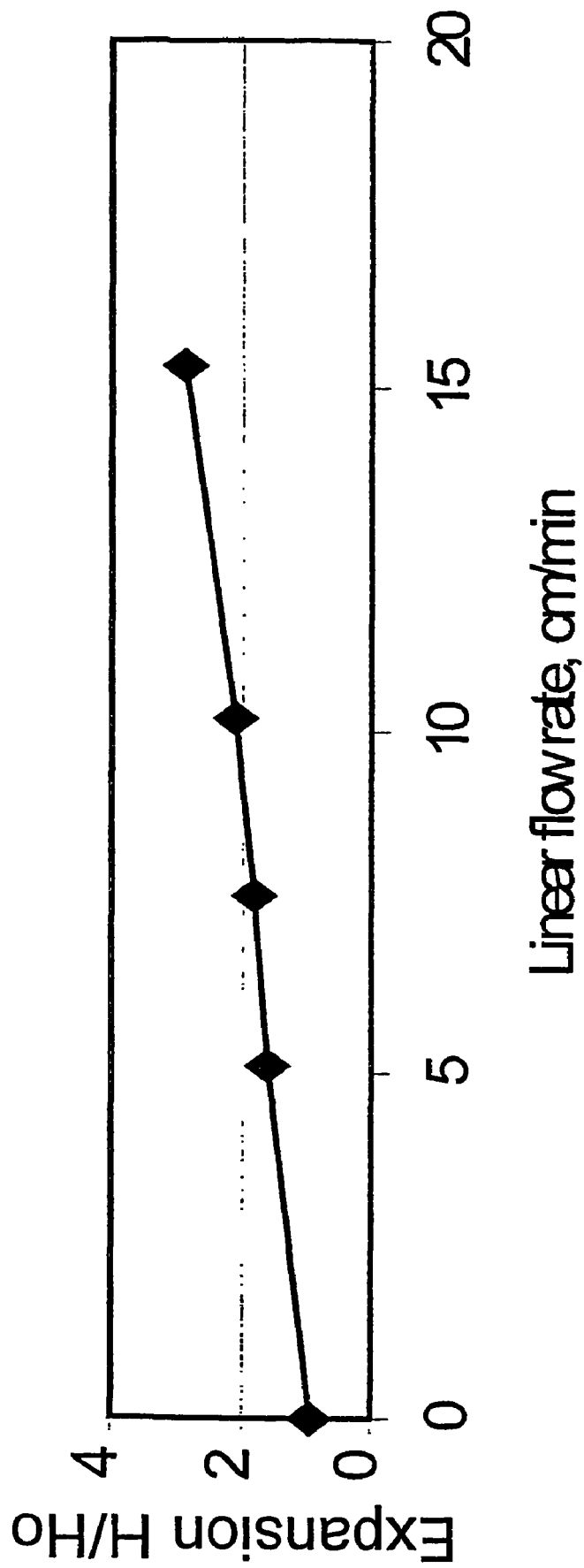
Figure 10C:
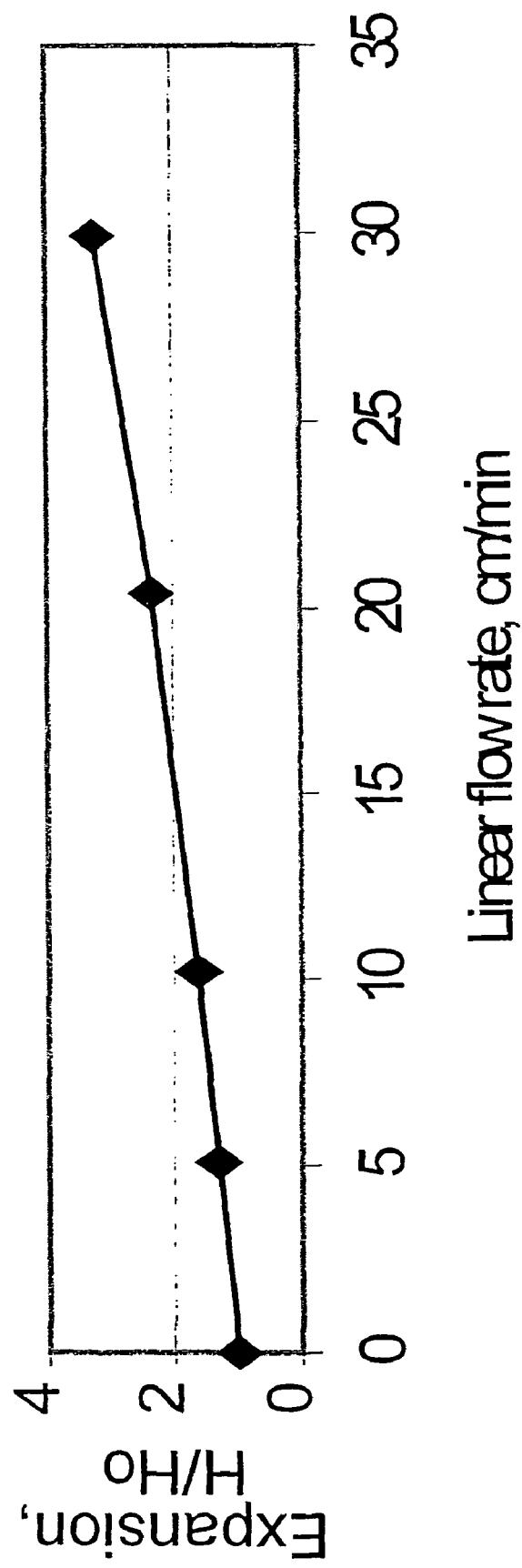

FIG. 10 shows the expansion curve on the three preparations: A, B and C

Figure 11:
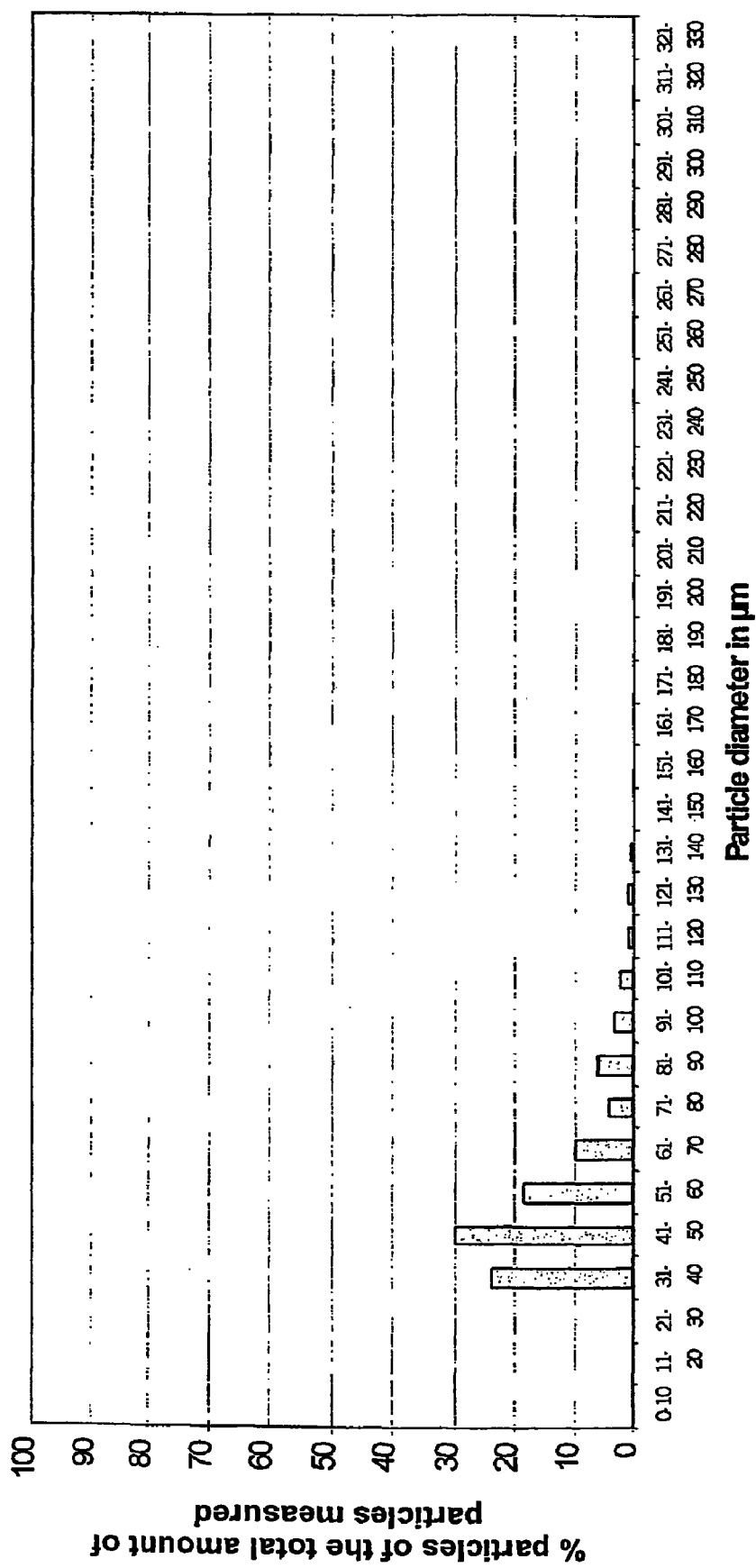
FIG. 11: Shows the particle distribution of tungsten carbide 8-agarose particles having a density of 2.4 g/ml and a mean particle size of 56 μm and 552 particles was measured.

Preparation A was determined to have a density of 2.4 g/ml and a particle size distribution as illustrated in FIG. 11.

Figure 12:
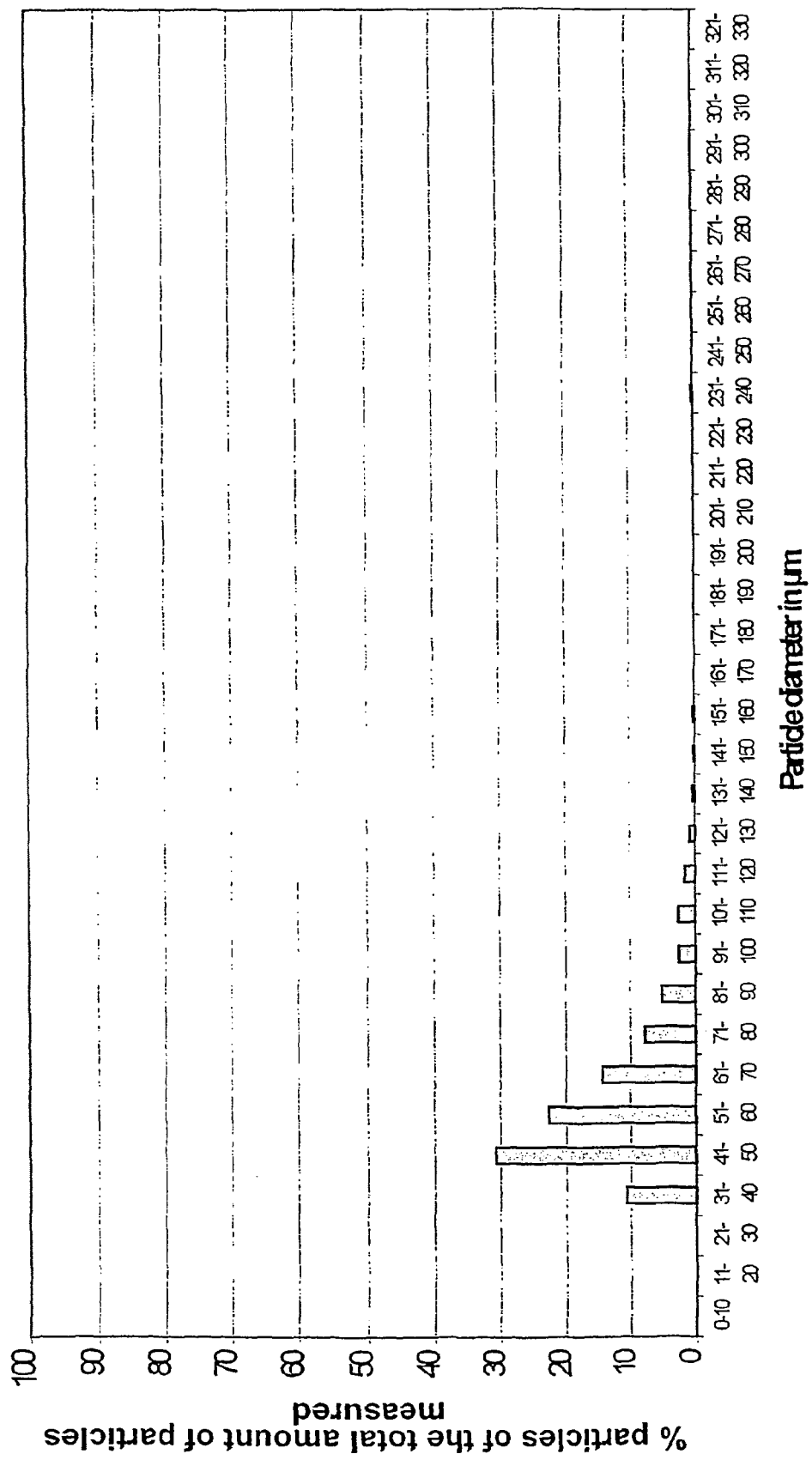
FIG. 12: Shows the particle distribution of tungsten carbide 8-agarose particles having a density of 3.3 g/ml and a mean particle size of 59 μm and 602 particles was measured.

Preparation B was determined to have a density of 3.3 g/ml and a particle size distribution as illustrated in FIG. 12.

Figure 13:
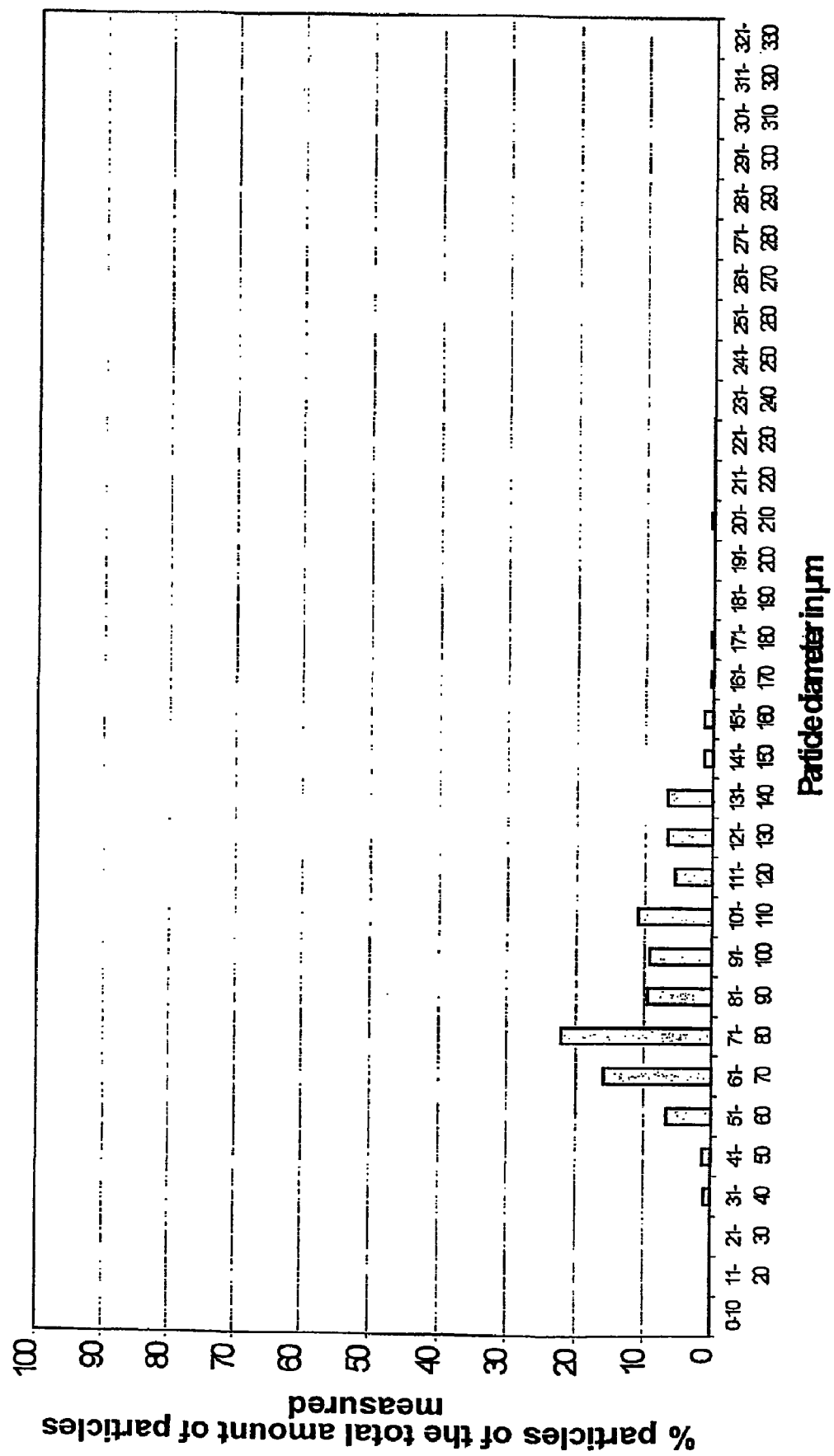
FIG. 13: Shows the particle distribution of tungsten carbide 8-agarose particles having a density of 3.2 g/ml and a mean particle size of 90 μm and 283 particles was measured.

Preparation C was determined to have a density of 3.2 g/ml and a particle size distribution as illustrated in FIG. 13.

The densities measured for the three preparations can be used for calculation of the average volume occupied by the tungsten carbide particles relative to the volume of the whole bead as described in the description:

Volume of tungsten carbide in:
Preparation A: approximately 10%
Preparation B: approximately 16%
Preparation C: approximately 15.4%

The mean particle size can be determined from the particle size distribution analysis:

Mean particle size:
Preparation A: 56 μm
Preparation B: 59 μm
Preparation C: 90 μm Example 21

EBA Adsorbents Comprising Tungsten Carbide Particles of 25 Micron Particle Size.

Figure 14:
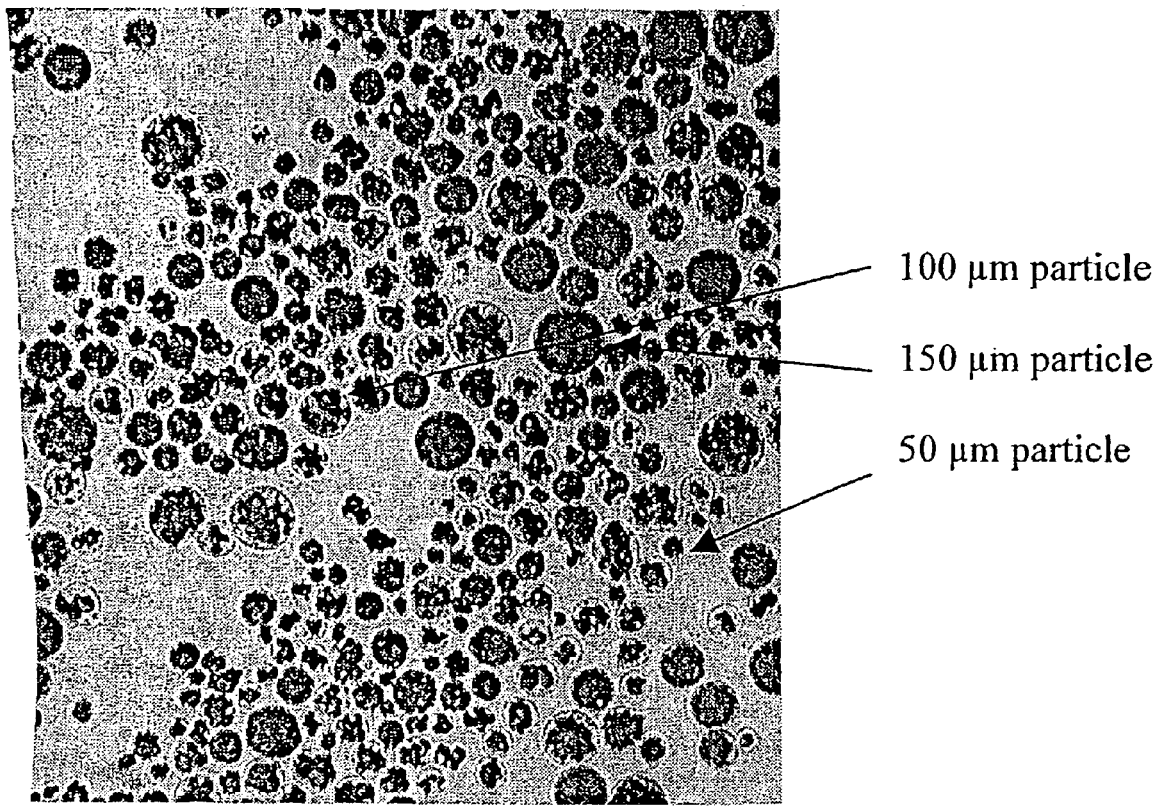
FIG. 14: Shows a microscopic picture a spherical UpFront tungsten carbide-25-agarose particles. The mean particle size is 77 μm and the density is 3.7 g/ml.

The term "UpFront tungsten carbide-25-agarose" refers to adsorbent particles produced by an emulsification process (tungsten carbide particles/melted agarose suspension emulsified in hot Vaseline oil followed by cooling, washing of the resulting agarose/tungsten carbide beads and sieving). They comprise a core material of tungsten carbide particles (WC 25.0, Kennametal Hertel, Germany) sized at 25 μm and a density of 15.6 g/ml. The adsorbent particles comprise the tungsten carbide particles as a high-density core of one or more tungsten carbide particles embedded in the spherical agarose bead (see FIG. 14). One preparation was analysed with respect to expansion as a function of flow rate in an EBA column.

Figure 15:
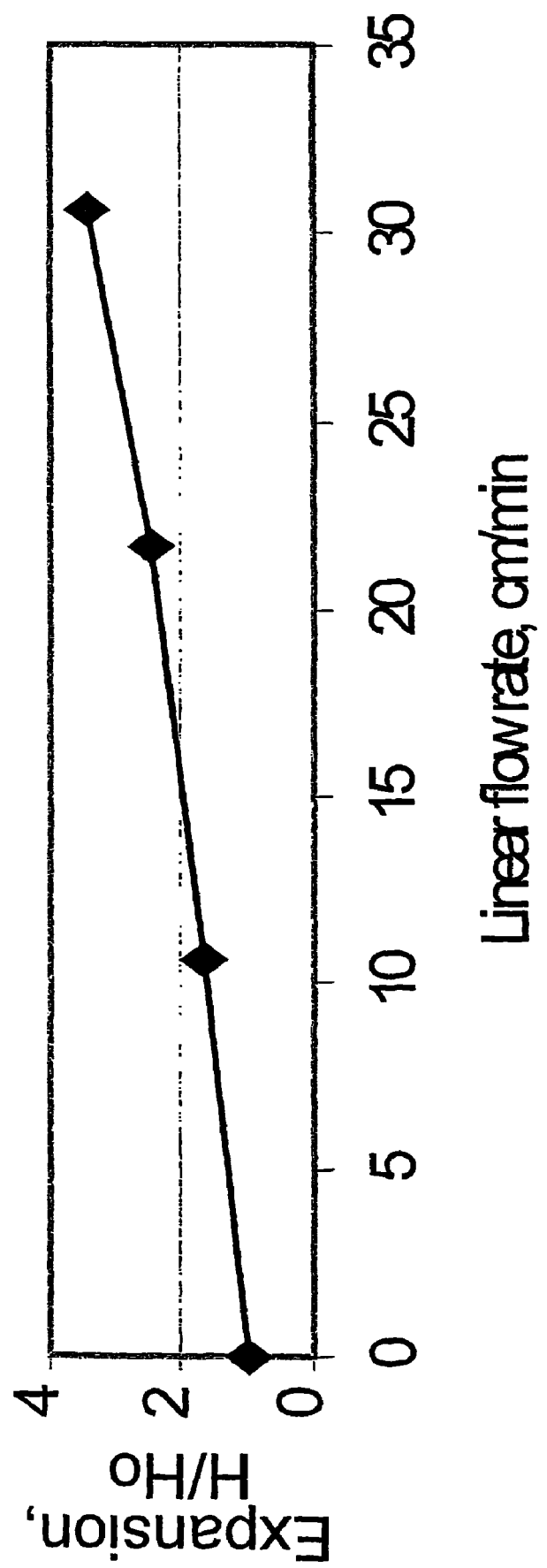
FIG. 15: Shows the expansion curve on UpFront tungsten carbide-25-agarose having a mean particle size is 77 μm and a density is 3.7 g/ml.

FIG. 15 shows the expansion curve on the preparation: D

Figure 16:
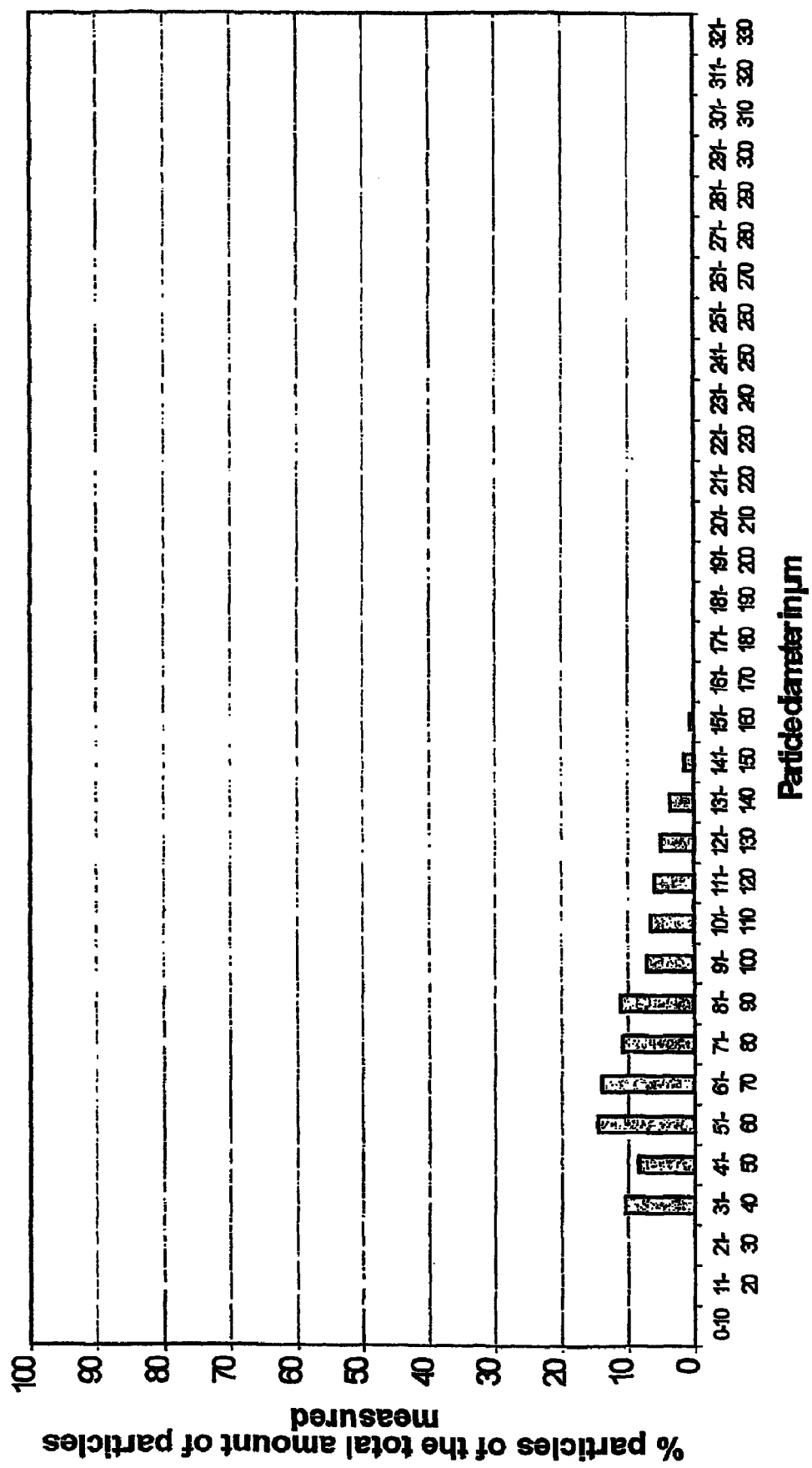
FIG. 16: Shows the particle distribution of UpFront tungsten carbide-25-agarose particles having a density of 3.7 g/ml and a mean particle size of 77 μm and 332 particles was measured.

Preparation D was determined to have a density of 3.7 g/ml and a particle size distribution as illustrated in FIG. 16.

The density measured for the preparation can be used for calculation of the average volume occupied by the tungsten carbide particles relative to the volume of the whole bead as described in the description:

Volume of tungsten carbide in:
Preparation D: Approximately 18.5%

The mean particle size can be determined from the particle size distribution analysis:

Mean particle size:
Preparation D: 77 μm

Example 22

EBA on Sweet Whey. Binding Capacity at High Flow Rate.

The four tungsten carbide-agarose preparations (A-D) described and characterised in example 20 and 21 where chemically derivatised as described in example 2 and 3 to produce four preparations of sulfonic acid ion exchangers.

These four ion exchangers where then analysed for their ability to bind lactoferrin as basically described in example 7.

Four experiments were performed labelled I, II, III and IV. The experiments illustrate the lactoferrin binding efficiency of the four particle preparations at a flow rate of 25 cm/min during load of the whey.

Four columns were packed. Each FastLine 20 column was packed with 10 cm glass beads and 5 cm packed bed height of the respective tungsten carbide-agarose-sulfonic acid cation exchanger. The four experiments comprised the four particle preparations described in example 1 and 2 (dette dokument):

Column I: Particle preparation A, mean particle size: 56 micron, density=2.4 g/ml
Column II: Particle preparation B, mean particle size: 59 micron, density=3.3 g/ml
Column III: Particle preparation C, mean particle size: 90 micron, density 3.2 g/ml
Column IV: Particle preparation D, mean particle size: 77 micron, density 3.7 g/ml Non-pasteurised sweet whey (from the production of Mozarella cheese) adjusted to pH 6.5 was loaded on the columns in a ratio at 1:300 and the 4 different columns were run at a linear flow rate of 25 cm/min.

Results:
Yield from measuring of OD280 of eluates.

| Column | Linear flow | Yield of LF per l whey loaded |
|---|---|---|
| I | 25 cm/min | 70 mg |
| II | 25 cm/min | 70 mg |
| III | 25 cm/min | 66 mg |
| IV | 25 cm/min | 69 mg |

Determination of purity from SDS page

| Column | Linear flow | Purity of LF eluate |
|---|---|---|
| I | 25 cm/min | 90% |
| II | 25 cm/min | 90% |
| III | 25 cm/min | 90% |
| IV | 25 cm/min | 90% |

The invention claimed is:

1. A method for the fractionation of a protein-containing mixture wherein the protein-containing mixture is selected from the group consisting of milk, milk derived products, milk derived raw materials, fruit derived products, fruit derived extracts, fish derived products, and fish derived extracts, said method comprising the steps of:
    a) applying said protein-containing mixture at a flow-rate of at least 5 cm/min to an adsorption column comprising an adsorbent, the adsorbent having a particle density of at least 1.8 g/ml and a mean particle size of at most 150 μm;
    b) eluting at least one protein from the adsorbent.

2. A method according to claim 1, wherein the applying of said protein-containing mixture is performed at a flow-rate of about 5-50 cm/min.

3. A method according to claim 1, wherein the adsorbent comprises a high density non-porous core having a density of at least 4 g/ml.

4. A method according to claim 1, wherein the adsorbent comprises a high density non-porous core having a density in the range of about 4-25 g/ml.

5. A method according to claim 1, wherein the adsorbent has a mean particle size of at most 120 μm.

6. A method according to claim 1, wherein the adsorbent has a mean particle size in the range of 40 to 150 μm.

7. A method according to claim 1, wherein the adsorbent comprises a non-porous core constituting of at the most 50% of the total volume of the adsorbent particle.

8. A method according to claim 1, wherein the adsorption column is selected from the group consisting of expanded bed adsorption column, a packed bed adsorption column and a combination thereof.

9. A method according to claim 1, wherein the adsorbent present in the column relative to the protein-containing mixture to be loaded on to the column are provided at a ratio of at least 1:1000 measured on a volume/volume basis.

10. A method according to claim 1, wherein eluting is performed with an eluant selected from the group consisting of dilute base, dilute acid, and water.

11. A method according to claim 10, wherein the diluted base is selected from the group comprising sodium hydroxide, potassium hydroxide, calcium hydroxide, ammonium hydroxide.

12. A method according to claim 1, wherein the elution of the bound substances from the adsorbent provides a final salt concentration in the eluate less than 50 mM salt.

13. A method according to claim 1, wherein the adsorbent comprises a porous material that comprises a polymeric base matrix.

14. A method according to the claim 13, wherein the polymeric base material is a polysaccharide.

15. A method according to claim 1, wherein the adsorbent has a binding capacity of at least 10 g/L of BSA according to test Method A.

16. A method according to claim 1, wherein at least one protein to be isolated is selected from the group consisting of lactoperoxidase, lactoferrin, bovine serum albumin, β-lactoglobulin, immunoglobulin, α-lactalbumin and glycomacropeptide.

17. A method according to claim 15, wherein at least one isolated protein mixture comprises at least 70% w/w of a single protein.

18. A method according to claim 1, wherein the purity of the protein to be isolated measured in the eluate is at least 65%.

19. A method according to claim 1, wherein the protein-containing mixture comprises at least 2 proteins and said fractionation of the at least 2 proteins is performed using an expanded adsorbent bed or packed adsorbent bed or combinations thereof.

20. A method according to claim 1, wherein a plug flow is established in the adsorbent by providing a layer of inert glass beads positioned in the stirring zone.

21. A method according to claim 1, wherein the particle size is less than 120 μm.

22. A method according to claim 1, wherein the particle size is less than 90 μm and the particle density is at least 1.8 g/ml.

23. A method according to claim 1, wherein the particle size is less than 75 μm and the particle density is at least 2.0 g/ml.

24. A method according to claim 1, additionally comprising the step of optionally adjusting the pH of the protein-containing mixture.

25. A method according to claim 1, additionally comprising the step of optionally washing the absorption column.

26. A method according to claim 1, wherein the absorbent comprises particles with at least one high density non-porous core, surrounded by a porous material.

* * * * *

UNITED STATES PATENT AND TRADEMARK OFFICE
CERTIFICATE OF CORRECTION

PATENT NO. : 7,812,138 B2
APPLICATION NO. : 10/478111
DATED : October 12, 2010
INVENTOR(S) : Lihme et al.

Page 1 of 1

It is certified that error appears in the above-identified patent and that said Letters Patent is hereby corrected as shown below:

Col. 5, line 45: "disclosed in (I. Porath et al.," should read --disclosed in (J. Porath et al.,--

Col. 6, line 36: "albumin, p-lactoglobulin" should read --albumin, β-lactoglobulin--

Col. 8, line 17: "continues system. In the" should read --continuous system. In the--

Col. 21, line 55: "(Janke & Kuinhel BMBH" should read --(Janke & Künhel BMBH--

Col. 34, line 10, claim 7: "constituting of at the most 50%" should read --constituting at the most 50%--

Signed and Sealed this
Eighteenth Day of December, 2012

David J. Kappos
*Director of the United States Patent and Trademark Office*